(12) United States Patent
Tashiro et al.

(10) Patent No.: US 8,045,099 B2
(45) Date of Patent: Oct. 25, 2011

(54) LIQUID CRYSTAL DISPLAY DEVICE

(75) Inventors: Kunihiro Tashiro, Matsusaka (JP);
Takahiro Sasaki, Taki-gun (JP);
Toshihiro Matsumoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 243 days.

(21) Appl. No.: 12/300,898

(22) PCT Filed: Apr. 16, 2007

(86) PCT No.: PCT/JP2007/058274
§ 371 (c)(1),
(2), (4) Date: Nov. 14, 2008

(87) PCT Pub. No.: WO2008/018213
PCT Pub. Date: Feb. 14, 2008

(65) Prior Publication Data
US 2009/0207357 A1    Aug. 20, 2009

(30) Foreign Application Priority Data
Aug. 10, 2006  (JP) .................................. 2006-218916

(51) Int. Cl.
*G02F 1/1333* (2006.01)
(52) U.S. Cl. ................ 349/88; 349/93; 349/94
(58) Field of Classification Search ............ 349/88, 349/93–94
See application file for complete search history.

(56) References Cited

U.S. PATENT DOCUMENTS

| | | |
|---|---|---|
| 2003/0086044 A1 | 5/2003 | Inoue et al. |
| 2003/0151703 A1 | 8/2003 | Nakanishi et al. |
| 2005/0001973 A1 | 1/2005 | Nakanishi et al. |
| 2005/0237471 A1 | 10/2005 | Kawamura |
| 2005/0253988 A1 | 11/2005 | Inoue et al. |
| 2007/0291207 A1 | 12/2007 | Nakanishi et al. |

FOREIGN PATENT DOCUMENTS

| | | |
|---|---|---|
| CN | 1410808 A | 4/2003 |
| CN | 1690783 A | 11/2005 |
| JP | 8-114804 | 5/1996 |
| JP | 2003-177418 | 6/2003 |
| JP | 2003-279995 | 10/2003 |
| JP | 3520376 | 2/2004 |

OTHER PUBLICATIONS

Chinese Office Action and English translation thereof mailed Feb. 12, 2010 in corresponding Chinese application 200780020811.6.
International Search Report for PCT/JP2007/058274, mailed Jul. 10, 2007.

*Primary Examiner* — Phu Vu
(74) *Attorney, Agent, or Firm* — Nixon & Vanderhye P.C.

(57) ABSTRACT

This invention provides a liquid crystal display device which can contribute to the stabilization of alignment of a liquid crystal and can improve the response speed. The liquid crystal display device comprises a pair of substrates and a liquid crystal layer held between the substrates. At least one of the pair of substrates has a polymer on its surface in contact with the liquid crystal layer. The surface shape of the polymer is in a substantially saw form as viewed from the cross-sectional direction of the substrate. The inclination azimuth of the inclination surface of the polymer is substantially the same as the liquid crystal alignment upon the application of the voltage. Preferably, the surface of the polymer has an approximately wedge shape as viewed from the vertical direction of the substrate, and the azimuth of the apex is approximately opposite to the liquid crystal alignment upon the application of the voltage.

8 Claims, 17 Drawing Sheets (a)

(b)

(c)

(d)

(a) 5msec (d)

(b) 10msec (e)

(c) 20msec (f)

(a)

(b)

(a)

(b)

(a)

(b)

US 8,045,099 B2

LIQUID CRYSTAL DISPLAY DEVICE

This application is the U.S. national phase of International Application No. PCT/JP2007/058274, filed 16 Apr. 2007, which designated the U.S. and claims priority to Japan Application No. 2006-218916, filed 10 Aug. 2006, the entire contents of each of which are hereby incorporated by reference.

TECHNICAL FIELD

The present invention relates to a liquid crystal display device. More specifically, the present invention relates to a liquid crystal display device which is particularly preferably used to improve alignment controllability of a liquid crystal in Vertical Alignment mode.

BACKGROUND ART

A liquid crystal display device which controls alignment of a liquid crystal to perform display has advantages such as slim profile, lightweight, and low power consumption, in comparison to CRT that is a conventional standard display. Therefore, such a liquid crystal display device has been widely used in various electronics. Particularly in an application such as a household TV, use of such a liquid crystal display device has been rapidly increased, recently. Various studies on a method of controlling alignment of a liquid crystal have been made in order to improve display qualities of this liquid crystal display device.

Multi-domain Vertical Alignment (hereinafter, also referred to as MVA) mode is known as a display mode effective for widening a viewing angle and improving a contrast ratio. FIG. 1 shows a configuration of a liquid crystal display device in MVA mode (MVA-LCD). As shown in FIG. 1, according to the MVA-LCD, liquid crystals 12 are aligned in accordance with a plurality of domains using a projective structure 13 formed on a substrate or a slit 11a provided for an electrode 11 for liquid crystal driving, formed on the substrate, in Vertical Alignment mode where the liquid crystals 12 are aligned to be substantially vertical to the electrode 11 during no voltage application and the liquid crystals 12 are aligned to be substantially parallel to the electrode 11 during voltage application.

The MVA-LCD can effectively widen the viewing angle and improve the contrast ratio, but it has still room for improvement in response speed. Particularly, an improvement in response speed at the time of intermediate scale display is needed for the MVA-LCD. Only liquid crystal molecules near the projective structure and/or the electrode slit can be quickly aligned in response to a voltage applied to the liquid crystal. Liquid crystals far from these alignment control structures respond late. Due to the low response speed of the liquid crystal, blurred moving images might be displayed. The MVA-LCD has also room for improvement in that the projective structures and/or the electrode slits reduce an aperture ratio (transmittance).

A Polymer Sustained Alignment (hereinafter, also referred to as PSA) technology has been known as a technology for improving the response speed or the aperture ratio (for example, refer to Patent Documents 1 to 3). FIG. 2 shows a schematic view showing the Polymer Sustained Alignment (PSA) technology. FIG. 2(a) shows a state where light is radiated for forming a polymer. FIG. 2(b) shows a liquid crystal display panel where a polymer has been formed by the photopolymerization. As shown in FIG. 2, according to the PSA technology, a monomer 14 is dispersed into liquid crystal 12, and under voltage application to the liquid crystal 12, the monomer 14 which has been dispersed into the liquid crystal 12 is photopolymerized by irradiation of light 16, thereby forming a polymer 14a on a surface of an alignment film 15. Then, this polymer 14a determines a pretilt of the liquid crystal 12 which is positioned on the surface of the alignment film 15.

According to the MVA-LCD, the alignment control is performed using only the projective structures and/or the electrode slits. Therefore, liquid crystal molecules near the projective structure and/or the electrode slit start to respond, followed by liquid crystal molecules at the intermediate part. In contrast, in a liquid crystal display device to which the PSA technology has been applied (PSA-LCD), polymers formed on the alignment film surface perform alignment control, and therefore, liquid crystal molecules in a region where the polymers have been formed respond at the same time. In the case that the PSA technology is applied to the MVA-LCD, the alignment control attributed to the MVA-LCD itself and the PSA technology is performed. The liquid crystal molecules near the projective structure and/or the electrode slit respond first, but shortly after that, the liquid crystal molecules at the intermediate part also respond at the same time. In addition, the PSA-LCD is advantageous in terms of aperture ratio (transmittance) because occupancy of the projective structure and/or the electrode slit on the substrate surface can be reduced or eliminated.

However, the PSA-LCD also has room for improvement in alignment stability of liquid crystal and improvement in response speed of liquid crystal.

[Patent Document 1]
Japanese Patent No. 3520376
[Patent Document 2]
Japanese Kokai Publication No. Hei-08-114804
[Patent Document 3]
Japanese Kokai Publication No. 2003-177418

DISCLOSURE OF INVENTION

The present invention has been made in view of the above-mentioned state of the art. The present invention has an object to provide a liquid crystal display device which can stabilize alignment of liquid crystal and improve a response speed of the liquid crystal.

The present inventors made various investigations on stabilization of alignment of liquid crystal and improvement in response speed of the liquid crystal, attributed to the PSA technology. The inventors noted that exact knowledge about why the alignment of liquid crystal is controlled by the PSA polymer has not been sufficiently solved yet. Then, the inventors made various investigations on the polymer formed by the PSA technology (hereinafter, also referred to as a PSA polymer) The inventors found that the alignment of the liquid crystal can be stabilized and the response speed of the liquid crystal can be improved if the PSA polymer has a substantially saw-shaped surface as viewed from a cross-sectional direction of the substrates and a direction of a tilt azimuth of a tilt surface of the PSA polymer is substantially the same as an alignment direction of the liquid crystal at the time of voltage application. As a result, the above-mentioned problems have been admirably solved, leading to completion of the present invention.

That is, the present invention is a liquid crystal display device including a pair of substrates and a liquid crystal layer interposed between the pair of substrates, wherein at least one of the pair of substrates includes a polymer on a surface in contact with the liquid crystal layer, the polymer has a substantially saw-shaped surface as viewed from a cross-sectional direction of the pair of substrates, and a direction of a tilt azimuth of a tilt surface of the polymer is substantially the same as an alignment direction of a liquid crystal at the time of voltage application.

In the present invention, the polymer which is formed on the surface in contact with the liquid crystal layer can be formed by the PSA technology. Specifically, such a polymer can be formed in the following manner. A monomer is dispersed into the liquid crystal layer, and while a voltage is applied to the liquid crystal layer, light is radiated and thereby the monomer in the liquid crystal layer is photopolymerized on the substrate surface.

The above-mentioned polymer has a substantially saw-shaped surface as viewed from a cross-sectional direction of the substrates, and a direction of a tilt azimuth of a tilt surface of the polymer is substantially the same as an alignment direction of the liquid crystal at the time of voltage application. In the present invention, a plurality of projections (irregular surface) formed by the polymers having such a surface shape act as an alignment control structure for determining the liquid crystal alignment, and thereby such polymers effectively contribute to the stabilization of alignment of the liquid crystal and the improvement in response speed of the liquid crystal.

In the present invention, the substantially saw shape is not especially limited as long as it is formed of a series of projections which project to the liquid crystal layer side. The substantially saw shape may be a wave shape. The reason why the above-mentioned polymer is formed to have a substantially saw shape as viewed from the cross-sectional direction of the substrates is because the substantially saw shape is particularly excellent in terms of alignment stabilization. If the polymer is formed to have a shape other than the substantially saw shape, a tilt surface having a different tilt azimuth also exists, which reduces the alignment stability.

The phrase that "a direction of a tilt azimuth of a tilt surface of the polymer is substantially the same as an alignment direction of the liquid crystal at the time of voltage application" means the followings: if a three-dimensional vector which points from a high position to a low position in a main tilt surface on a side where a tilt angle is smaller of the tilt surfaces of the substantially saw shape is projected onto the substrate surface to provide a "tilt azimuth" that is an azimuth of a two-dimensional vector, this tilt azimuth is substantially the same as an "alignment azimuth of liquid crystal" that is an azimuth of a two-dimensional vector of the liquid crystal molecule, which is obtained by projecting a three-dimensional vector which points from one end in contact with the polymer to the other end onto the substrate surface. Preferably, an angle made by the tilt azimuth of the polymer with the alignment azimuth of the liquid crystal is 45° or less. Further, it is preferable that the direction of the liquid crystal molecule is substantially vertical to the main tilt surface of the substantially saw shape as viewed in the cross sectional direction of the substrates.

It is preferable that the polymer has a substantially wedge-shaped surface as viewed from a vertical direction of the pair of substrates, and a direction of a top azimuth of the substantially wedge-shaped surface is substantially opposite to an alignment direction of a liquid crystal at the time of voltage application. If the surface of the polymer further has such a shape, the reduction in contrast, due to the projection, can be prevented and simultaneously, the alignment can be stabilized due to the shape.

In this embodiment, the substantially wedge shape is not especially limited as long as it is the following shape: one end is wide (one end has a certain width); and the width decreases toward the other end (for example, a triangle and a trapezoid). It is preferable that the shape has an acute-angled top. For example, an acute triangle is preferable. The reason why the above-mentioned polymer is formed to have a substantially wedge shape as viewed from a vertical direction of the substrates is because the substantially wedge shape is particularly excellent in terms of contrast ratio and alignment stability. If the monomer in the liquid crystal layer is photopolymerized on the substrate surface under voltage application, the planar shape of the polymer when it is viewed from the vertical direction of the substrates is changed into a substantial needle shape, a substantially wedge shape, a substantially polygonal shape, a non-fixed shape (continuum) as a monomer concentration or a polymerization degree increases. If the planar shape is a substantially needle shape, the reduction in contrast ratio, due to the projection, is small, but the effect of stabilizing the alignment attributed to the shape is also small. If the planar shape is a substantially polygonal shape, the effect of stabilizing the alignment attributed to the shape is large, but the reduction in contrast ratio, due to the projection, is also large.

The phrase that "a direction of a top azimuth of the substantially wedge-shaped surface is substantially opposite to the alignment direction of the liquid crystal at the time of voltage application" means the following. If a three-dimensional vector which points from a wide end (on the bottom side) to the top of the substantially wedge shape is projected onto the substrate surface to provide a "tilt azimuth" that is an azimuth of a two-dimensional vector, this tilt azimuth is substantially opposite to an "alignment azimuth of liquid crystal" that is an azimuth of a two dimensional vector of the liquid crystal molecule, which is obtained by projecting the three dimensional vector which points from the end on the side in contact with the polymer to the other end onto the substrate surface. It is preferable that an angle made by the top azimuth of the polymer with the alignment azimuth of the liquid crystal is 135° or more.

The configuration of the liquid crystal display device of the present invention may include other components as long as it essentially includes the above-mentioned components. It is preferable that an alignment film is arranged on the substrate side of the above-mentioned polymer, for example.

Preferable embodiments of the liquid crystal display device of the present invention are mentioned below in more detail.

In the present invention, it is preferable that at least one of the pair of substrates includes an alignment film, and the polymer is partly formed on a surface of the alignment film. If the polymer is formed on the entire surface of the alignment film, the liquid crystal molecules are uniformly pretilted. Therefore, the contrast ratio might be significantly reduced in VA mode, for example. Such a significant reduction in contrast ratio can be prevented and the effect of the improvement in response speed can be obtained if the polymer is partly formed on the alignment film surface. In addition, the addition amount of the monomer can be minimized, and therefore, time taken for the polymerization can be significantly shortened. It is preferable that a proportion of an area where the polymer is formed on the alignment film surface is 10 to 80%. If it is less than 10%, the operation and effects of the present invention, attributed to the polymer, might not be obtained. If it is more than 80%, the reduction in contrast ratio might not be sufficiently suppressed.

It is preferable that at least one of the pair of substrates includes a vertical alignment film, and the polymer is formed on a surface of the vertical alignment film. The vertical alignment film is not especially limited as long as the liquid crystal molecules are aligned to be substantially vertical to a surface of the alignment film. The present invention is preferably used to stabilize the alignment of the liquid crystal and improve the response speed of the liquid crystal, in vertical alignment mode. In order to obtain the surface shape of the polymer in accordance with the present invention, it is preferable that the polymer is formed on the vertical alignment film.

According to the present invention, it is more preferable that the above-mentioned embodiment in which the polymer is partly formed on the alignment film surface and the embodiment in which the vertical alignment film is used as the alignment film are combined. That is, an embodiment in which at least one of the pair of substrates includes a vertical alignment film, and the polymer is partly formed on a surface of the vertical alignment film is more preferable. Due to the above-mentioned combination, the reduction in contrast ratio can be further suppressed and the alignment of the liquid crystal can be stabilized. That is, the above-mentioned polymer is partly formed on the surface of the alignment film, thereby suppressing a significant reduction in contrast ratio. Further, the polymer of the present invention is formed to have an excellent surface shape using a vertical alignment film as the alignment film. As a result, the alignment of the liquid crystal can be more effectively stabilized.

Effect of the Invention

According to the liquid crystal display device of the present invention, the alignment of the liquid crystal can be stabilized and the response speed of the liquid crystal can be improved, and thereby excellent display qualities can be provided. Such a liquid crystal display device is preferably used as an in-car display device.

BEST MODES FOR CARRYING OUT THE INVENTION

The present invention will, hereinafter, be described in more detail below with reference to Embodiments using drawings, but the present invention is not limited to only these Embodiments.

Embodiment 1

In the present Embodiment, a PSA treatment was performed as follows to produce a liquid crystal display panel in MVA mode.

A vertical alignment film (product of NISSAN CHEMICAL INDUSTRIES, LTD.) was formed on a surface on an array substrate and a surface on a counter substrate to prepare an empty panel. The array substrate includes a pixel electrode arranged in each pixel, and a thin film transistor which controls a voltage applied to the pixel electrode. The counter substrate includes a color layer in each pixel and a common electrode below the alignment film. The vertical alignment film is made of polyimide. In the present Embodiment, projective structures were formed between the common electrode and the alignment film on the counter substrate in a rib pattern, and the pixel electrode on the array substrate was provided with a slit.

Then, into the empty panel, negative liquid crystal (product of Merk & CO., saturated voltage: 6V) into which 0.3 wt % of polyfunctional acrylate monomers having a methacryloyl group had been added were injected. In such a manner, a liquid crystal display panel before the PSA treatment was produced. Successively, the PSA treatment was performed through the following two-step irradiation. The primary irradiation was performed as follows. While an alternating voltage of 10V is applied to the liquid crystal layer, the liquid crystal layer is irradiated with UV having an emission-line peak between a wavelength of 300 and 400 nm under the following conditions: an intensity of irradiation light of 25 mW/cm$^2$, and an amount of irradiation light of 30 J/cm$^2$ (each based on I line (365 nm)). As a result, the polyfunctional acrylate monomers were polymerized to form PSA polymers on the alignment film surface. In such a manner, a pretilt of the liquid crystal is determined. The secondary irradiation was performed as follows. The liquid crystal layer was exposed under a fluorescent lamp for 48 hours without voltage application, and thereby residual monomer in the liquid crystal layer was removed. The two-step irradiation was performed only from the array substrate side. A glass substrate/a gate insulating film (SiNx)/a final passivation film (SiNx)/an interlayer insulating film (acrylic resin)/a transparent electrode (ITO)/an alignment film (polyimide) are stacked to constitute a transmission area of the array substrate. Thus, a liquid crystal display panel of the present Embodiment was completed. A retarder, a polarizer, and the like are arranged on each surface of the panel, and in a transmissive liquid crystal device, a backlight and the like is further arranged on the side opposite to the display surface of the liquid crystal display panel. In such a manner, a liquid crystal display device can be produced.

Embodiment 2

A liquid crystal panel in Embodiment 2 was produced in the same manner as in Embodiment 1, except that instead of the slit-rib bent pattern for MVA, a slit stripe pattern for evaluation was formed on the array substrate and the counter substrate as the alignment control structure (both of the array substrate and the counter substrate are provided with slits).

Comparative Embodiment 1

A liquid crystal display panel was produced without the PSA treatment. The liquid crystal display panel was produced in the same manner as in Embodiment 1, except that the above-mentioned step in which the polyfunctional acrylate monomer having a methacryloyl group is added into negative liquid crystal was omitted.

Comparative Embodiment 2

A liquid crystal display panel was produced in the same manner as in Embodiment 2, except that no voltage was applied to the liquid crystal layer when the primary irradiation was performed in the PSA treatment.

Comparative Embodiment 3

A liquid crystal display panel was produced in the same manner as in Embodiment 2, except that the UV irradiation amount was reduced (4 J/cm$^2$) when the primary irradiation was performed in the PSA treatment.

Thus-prepared liquid crystal display panels were verified for structural features and/or characteristics through (1) SEM observation and TEM observation, (2) AFM surface analysis, and (3) analysis of liquid crystal response.

(1) SEM Observation and TEM Observation

Samples were each obtained from the liquid crystal display panels in Embodiment 1 and Comparative Embodiment 1 in the following manner. One of the substrates was separated and the liquid crystal was removed using IPA (isopropyl alcohol) while keeping the PSA polymer formed on the alignment film surface from being dissolved by IPA. In each of the thus-obtained samples, the planar surface of the alignment film was subjected to a scanning electron microscope (SEM) observation with a SEM and the cross-sectional surface of the alignment film was subjected to a cross-sectional surface transmission electron microscope (TEM) observation with a TEM.

FIG. 3 is a plane SEM photograph of an alignment film surface. FIG. 3(a) shows a sample which had been subjected to the PSA treatment, obtained from the liquid crystal display panel in Embodiment 1. FIG. 3(b) shows a sample which had not been subjected to the PSA treatment, obtained from the liquid crystal display panel in Comparative Embodiment 1. The SEM photograph in FIG. 3 was taken under the conditions: an accelerating voltage of 5 kV and a magnification of 100 k (a magnification of 100000).

FIG. 4-1 is a cross-sectional TEM photograph of the alignment film surface and shows a sample cut from the substantially central part in the pixel, shown by the dotted line in FIG. 4-2. FIG. 4-1(a) shows a sample which had been subjected to the PSA treatment, obtained from the liquid crystal display panel in Embodiment 1. FIG. 4-1(b) shows a sample which had not been subjected to the PSA treatment, obtained from the liquid crystal display panel in Comparative Embodiment 1. In FIG. 4-1, the arrow shows apart where the PSA polymers are formed on the alignment film.

The plane SEM photographs and the cross-sectional TEM photographs shown in FIGS. 3 and 4-1 show that many projections were formed in a dotted pattern on the alignment film in the sample which had been subjected to the PSA treatment, obtained from the liquid crystal display panel in Embodiment 1, but no projections were observed in the sample which had not been subjected to the PSA treatment. This shows that the PSA polymers were formed partly (separately at some positions) on the alignment film surface. In the case that the PSA polymers were formed separately at some positions, the part which provides the liquid crystal with a pretilt does not increase too much, and therefore a high contrast can be obtained in display mode such as vertical alignment mode.

Whether or not the PSA polymers are partly formed on the alignment film surface depend on (A) conditions of materials for the monomer and the alignment film and (B) an addition amount of the monomer and conditions of the UV irradiation. With regard to (A), an alignment film which has a low wetting property (dispersibility) to the monomer is preferable. With regard to (B), it is preferable that the addition amount of the monomer is small and the UV irradiation is performed in such a way that the polymerization reaction gradually proceeds. It has been found that the PSA polymers are partly formed on the alignment film surface under the following conditions, for example: with regard to (A), a polyfunctional acrylate monomer having an acryloyl group or a methacryloyl group is used as the monomer and a vertical alignment film made of polyimide was used as the alignment film; and with regard to (B), 0.3 wt % or less of the monomer was added and the UV was irradiated at an intensity of 30 mW/cm$^2$ or less (based on I-line).

(2) AFM Surface Analysis

Samples were obtained from the liquid crystal display panels in Embodiment 2 and Comparative Embodiments 2 and 3 as follows, respectively. One of the substrates was separated and the liquid crystal was removed using IPA (isopropyl alcohol) while keeping the PSA polymer formed on the alignment film surface from being dissolved. In each of thus-obtained samples, the surface of the PSA polymer was analyzed with an atomic force microscope (AFM).

FIG. 5 shows a result of the AFM surface analysis of the sample obtained from the liquid crystal display panel in Comparative Embodiment 2. That is, FIG. 5 shows the result in the case that the PSA treatment was performed under no voltage application. FIG. 5(a) is a perspective view showing analysis results. FIG. 5(b) is a planar view showing analysis results. FIGS. 5(c) and (d) are cross-sectional views showing cross sections taken along lines A-B and C-D shown in FIGS. 5(a) and 5(b), respectively. In the region shown in FIG. 5(b), no transparent electrode (ITO) was arranged.

FIG. 6 shows a result of the AFM surface analysis of the sample obtained from the liquid crystal display panel in Comparative Embodiment 3. That is, FIG. 6 shows a result in the case where the PSA treatment was performed under voltage application (10V) and the UV irradiation amount was smaller (4 J/cm$^2$) than that in Embodiment 2.

FIG. 7 shows a result of the AFM surface analysis of the sample obtained from the liquid crystal display panel in Embodiment 2. That is, FIG. 7 shows a result in the case where the PSA treatment was performed under voltage application (10V); the liquid crystal layer is irradiated with UV having an emission-line peak at a wavelength of 300 to 400 nm under the following conditions: an intensity of irradiation light of 25 mW/cm$^2$; and an amount of irradiation light of 30 J/cm$^2$ (each based on I line (365 nm)). FIG. 7(a) is a perspective view showing analysis results. FIG. 7(b) is a planar view showing analysis results. FIG. 7(c) is a planar view showing arrangement of electrodes in the region shown in FIG. 7(b). FIGS. 7(d) and 7(e) are views showing cross sections taken along lines E-F and G-H shown in FIGS. 7(a) and 7(b), respectively. The white arrows in FIGS. 7(a), 7(b), 7(d), and 7(e) each show a top azimuth of the projection formed by the PSA polymers, and a tilt azimuth of the PSA polymers. These azimuths are substantially opposite to each other. In the region shown in FIG. 7(c), a transparent electrode (ITO) 21 and a slit 21a thereof are alternately formed.

As shown in FIG. 5, if the photopolymerization was performed under no voltage application, a projective PSA polymer having planar and cross sectional shapes with no directionality was formed. As shown in FIG. 6, if the photopolymerization was performed under voltage application (10V) and at a low-UV irradiation amount (4 J/cm$^2$), a substantially needle-shaped PSA polymer having planar and cross-sectional shapes with no directionality was formed. As shown in FIG. 7, if the photopolymerization was performed under voltage application (10V) and at a sufficiently high UV irradiation amount (30 J/cm$^2$), a substantially saw-shaped PSA polymer having planar and cross-sectional shapes with directionality was formed. In addition, the planar shape of the PSA polymer is a substantially wedge shape having an acute-angled top, and a top azimuth of the PSA polymer is the same as an extending azimuth of the fine electrode slit. Due to the PSA polymer having such a shape, the effect of alignment stability can be obtained in the present invention.

The PSA polymers formed on the alignment film surface are differently observed between the AFM surface analysis results shown in FIGS. 5 to 7, and the plane SEM photograph shown in FIG. 3 and the cross-sectional TEM photograph shown in FIG. 4-1. The reason of this is mentioned below. In the plane SEM observation and the cross-sectional TEM observation, a "more micro-region" was scanned with electron line. In contrast, the "more macro-region" was scanned with a probe called a cantilever in the AFM. Hence, the plane SEM photograph and the cross-sectional TEM photograph display an object which has been enlarged with a uniform magnification. In contrast, according to the AFM surface analysis, an object which has been enlarged with a higher magnification in the height direction is displayed in order to emphasize the surface shape. Due to this difference, the irregularities attributed to the PSA polymers formed on the alignment film surface are emphatically displayed according to the AFM surface analysis. In addition, the object is scanned with a probe called a cantilever in the AFM. Therefore, even if the PSA polymers are formed separately at some positions on the alignment film surface, the probe is finely vibrated even at the flat part as long as the PSA polymers are formed with a certain or higher density. As a result, the flat part is difficult to display.

The sample obtained from the liquid crystal display panel in Embodiment 1 was also subjected to the AFM analysis to analyze the PSA polymer surface. FIG. 8 shows results of AFM surface analysis of a sample obtained from the liquid crystal display panel in Embodiment 1. That is, FIG. 8 shows the results obtained when the liquid crystal display panel in MVA mode was subjected to the PSA treatment under voltage application (10V) by being irradiated with UV which has an emission line peak at a wavelength between 300 and 400 nm under the following conditions: an irradiation intensity of at 25 mW/cm$^2$; and an irradiation amount of 30 J/cm$^2$ (each based on I line (365 nm)). FIG. 8(a) is a planar view showing a pixel region to be subjected to the surface analysis. FIG. 8(b) is a perspective view showing analysis results. FIG. 8(c) is a planar view showing analysis results. FIG. 8(d) is a planar view schematically showing an alignment azimuth of a liquid crystal in the region shown in FIG. 8(c). FIGS. 8(e) and 8(f) are views showing cross sections taken along lines I-J and K-L shown in FIGS. 8(b) and 8(c), respectively. The white arrows in FIGS. 8(a) and (b) show a scanning azimuth of the probe. The white arrows in FIGS. 8(b), (c), (e), and (f) show a top azimuth and a tilt azimuth of a tilt projection formed by the PSA polymer. Over the entire region shown in FIG. 8(c), a transparent electrode (ITO) 21 is arranged.

As shown in FIG. 8, even if the PSA technology is applied to the liquid crystal display panel in MVA mode, the PSA polymer whose cross section has a substantially saw shape with directivity is formed. The tilt azimuth of the tilt surface is almost the same as the alignment azimuth of the liquid crystal at the time of voltage application. The PSA polymer has a substantially wedge-shaped plane having an acute-angled top. The top azimuth of the PSA polymer is almost opposite to the alignment of the liquid crystal at the time of voltage application. Further, the tilt angle of the tilt surface of the projection was 2 to 4° and the height of the projection was 50 to 200 nm. The PSA polymer having such a shape is formed, and thereby an effect of stabilizing alignment can be obtained in the present invention.

FIG. 9 shows a relationship between the top azimuth of the tilt projection formed by the PSA polymer 34a and the alignment azimuth of the liquid crystal molecule 12. As shown in the planar view in FIG. 9(a), the top azimuth of the tilt projection and the alignment azimuth of the liquid crystal molecule 12 are opposite. The tilt azimuth of the tilt projection and the alignment azimuth of the liquid crystal molecule 12 are the same. This is because, as shown in the cross-sectional view in FIG. 9(b), the tilt projection is tiled in such a way that the top of the wedge shape is the highest and the tilt azimuth on the tilt surface is opposite to the top azimuth. In FIG. 9(b), the range shown by the inverted triangle arrow is a main tilt surface.

Whether or not the PSA polymer exhibits the above-mentioned anisotropy on the alignment film surface depends on (C) the alignment conditions of the liquid crystal and (D) conditions of applied voltage and UV irradiation at the time of photopolymerization. With regard to (C), it is preferable that the liquid crystal near the alignment film surface is more uniformly aligned. With regard to (D), it is preferable that the liquid crystal near the alignment film surface is more tilted and the polymerization of PSA polymer sufficiently proceeds. It has been found that the PSA polymer exhibits the anisotropy on the alignment film surface, for example, under the following conditions: with regard to (C), the liquid crystal is not twist-aligned and the azimuth angle of the liquid crystal alignment less varies; and with regard to (D), a voltage which is 1.5 times or larger than a saturated voltage of the liquid crystal material (9V or larger when a liquid crystal material having a saturated voltage of 6V is used) is applied and UV is radiated at 8 J/cm$^2$ or more (based on I line).

(3) Analysis of Liquid Crystal Responsivity

The effect of improving the response speed of the liquid crystal, attributed to the formation of the PSA polymer, was simulated. The responsivity analysis was performed under the following four conditions (p) to (s). The condition (s) corresponds to Examples 1 and 2. According to this simulation, as shown in FIGS. 10-1 to 10-10, the following structure was analyzed. A liquid crystal layer 22 is arranged between a pair of array and counter substrates 30 and 40 having a length of 20 µm and a width of 40 µm. A pair of array-side and counter-side electrodes 31 and 41 is provided with slits 31a and 41a each having a width of 3 µm, respectively. The slits 31a and 41a are each arranged at one end of the electrodes 31 and 41 not to face each other. In addition, a plurality of these structures are continuously arranged in such a way that one structure is symmetry with respect to boundary lines in the vertical and horizontal directions of another structure. Condition (p): no PSA polymer exists and the liquid crystal is not pretilted. In FIG. 12, it is shown by "without polymer (not aligned)." Condition (q): the PSA polymer exists and the liquid crystal is not pretilted. In FIG. 12, it is shown by "with polymer (not aligned)."

Condition (r): no PSA polymer exists and the liquid crystal is pretilted uniformly on the entire surface. In FIG. 14, it is shown by "without polymer (aligned on the entire surface)." Condition (s): the PSA polymer exists and only the liquid crystal on the PSA polymer is pretilted. In FIG. 14, it is shown by "with polymer (partly aligned)."

Under the condition (p), a liquid crystal display panel having a structure shown in FIGS. 10-1 and 10-2 was subjected to a simulation under the following conditions: a pretilt angle of liquid crystal at the both interfaces of the array-side electrode 31 and the counter-side electrode 41 is 90°; the thickness of the liquid crystal layer 22 is 3 µm; an applied voltage is 6V; and negative liquid crystal (dielectric constant $\epsilon_1$ in the direction parallel to the electrode surface=3.3, and dielectric constant $\epsilon_2$ in the normal direction on the electrode surface=6.1).

Under the condition (q), a liquid crystal display panel having a structure shown in FIGS. 10-3 and 10-4 was subjected to a simulation under the following conditions, in addition to the condition (p): the PSA polymer 34a is an acrylic resin obtained by polymerizing a polyfunctional acrylate monomer; a dielectric constant $\epsilon$ is 3.2; and a height d is 170. As shown in FIG. 10-5, the tilt projection formed by the PSA polymer 34a has an isosceles triangle-shaped plane whose bottom side is 3 µm and whose height is 3 µm. The distance between tops of adjacent two projections is 1 µm. Other conditions are the same as the condition (p).

Under the condition (r), a liquid crystal display panel having a structure shown in FIGS. 10-6 and 10-7 was subjected to a simulation under the following conditions: a pretilt angle of liquid crystal at the interface of the array-side electrode 31 is 88°; a pretilt angle of liquid crystal pretilt angle at the interface of the counter-side electrode 41 is 90°; a thickness of the liquid crystal layer 22 is 3 μm; an applied voltage is 6V; and negative liquid crystal ($\epsilon_1=3.3$, $\epsilon_2=6.1$). The white arrow in FIG. 10-7 shows a pretilt azimuth of the liquid crystal.

Under the condition (s), a liquid crystal display panel having a structure shown in FIGS. 10-8 to 10-10 was subjected to a simulation under the following conditions in addition to the condition (r): as in the condition (q), the PSA polymer 34a is an acrylic resin obtained by polymerizing a polyfunctional acrylate monomer; a dielectric constant $\epsilon$ is 3.2; and a height d is 170 nm. The white arrow in FIGS. 10-9 and 10-10 shows a pretilt azimuth of the liquid crystal 32.

FIGS. 11 to 14 show results of the response analysis under the conditions (p) to (s). FIGS. 11 and 13 are views showing the state where the alignment of the liquid crystal varies as the time has passed since the voltage application. FIG. 11(a) shows the liquid crystal 5 msec later after the voltage application; FIG. 11(b) shows the liquid crystal 10 msec later after the voltage application; and FIG. 11(c) shows the liquid crystal 20 msec later after the voltage application, under the condition (p). FIG. 11(d) shows the liquid crystal 5 msec later after the voltage application; FIG. 11(e) shows the liquid crystal 10 msec later after the voltage application; and FIG. 11(f) shows the liquid crystal 20 msec later after the voltage application, under the condition (q). FIG. 13(a) shows the liquid crystal 5 msec later after the voltage application; FIG. 13(b) shows the liquid crystal 10 msec later after the voltage application; and FIG. 13(c) shows the liquid crystal 20 msec later after the voltage application, under the condition (r). FIG. 13(d) shows the liquid crystal 5 msec later after the voltage application; FIG. 13(e) shows the liquid crystal 10 msec later after the voltage application; and FIG. 13(f) shows the liquid crystal 20 msec later after the voltage application, under the condition (s). FIG. 12 is a graph for comparison, showing the variation of the transmissive light intensity as time has passed since the voltage application under the conditions (p) and (q). FIG. 14 is a graph for comparison, showing the variation of the transmissive light intensity as time has passed since the voltage application under the conditions (r) and (s).

Under the condition (p), nothing other than the liquid crystal exists on the alignment film surface and the liquid crystal is not pretilted at all under no voltage application. Under the condition (q), the PSA polymer is formed on the alignment film surface and the liquid crystal is not pretilted at all under no voltage application. That is, the PSA treatment is performed under no voltage application. The comparison between the results under the conditions (p) and (q) clarifies whether or not the PSA polymer having a surface shape with an anisotropic property acts as a dielectric and thereby the response speed is improved.

Under the condition (r), nothing other than the liquid crystal is formed on the alignment film surface and the liquid crystal is pretilted on the entire surface under no voltage application. That is, the alignment treatment such as rubbing is subjected to the entire surface. Under the condition (s), the PSA polymer is formed on the alignment film surface and only the liquid crystal which exists on the PSA polymer is pretilted under no voltage application. That is, the PSA treatment is performed under voltage application. In this simulation, the liquid crystal only on one substrate side is pretilted, as a matter of convenience. The comparison between the results under the conditions (r) and (s) verifies how much the response speed is improved when the PSA polymer having a surface shape with an anisotropic property acts as the tilt projection of the present invention.

The results shown in FIG. 12 show the followings. Even if the PSA polymer exists, the response speed cannot be improved only by the electric field effect attributed to the PSA polymer that is a dielectric, in the case where the liquid crystal is not pretilted. In contrast, the results shown in FIG. 14 show that, if the liquid crystal is pretilted, by partly forming the tilt projection of the PSA polymer, the shape effect of the PSA polymer improves the response speed at the level equivalent to that in the case where the liquid crystal is pretilted on the entire surface.

(4) Analysis of Liquid Crystal Alignment

Simulations were performed for clarifying an influence of the PSA polymer on the alignment state of the liquid crystal. The simulations were performed under the following four conditions (p) to (s), similarly in the above-mentioned response analysis. Calculation conditions used for alignment analysis are shown in FIG. 15. Conditions other than those shown below are in accordance with the conditions of the responsivity analysis.

FIGS. 16 to 19 show the results of the alignment analysis under the conditions (p) to (s). FIG. 16 shows the results under the condition (p). FIG. 17 shows the results under the condition (q). FIG. 18 shows the results under the condition (r). FIG. 19 shows the results under the condition (s). In each figure, (a) shows a variation with time of a polar angle, and (b) shows a variation with time of an azimuth angle. The polar angle is a tilt angle of a liquid crystal molecule relative to the electrode surface. The azimuth angle is an angle representing an azimuth from one end close to the electrode surface of the liquid crystal molecule to the other end when the liquid crystal molecule is projected to the electrode surface. If the variation in the azimuth angle of the liquid crystal alignment is not observed, it is shown with 0°. In the alignment analysis, only the alignment of the liquid crystal on the analyzed cross sectional surface shown in FIG. 15 is extracted.

The results in FIGS. 16 and 17 show that if the liquid crystal is not pretilted, the electric field effect of the PSA polymer that is a dielectric rather increases the alignment variation in the polar angle and the azimuth angle. In contrast, the results shown in FIGS. 18 and 19 show that if the liquid crystal is pretilted, the shape effect attributed to the tilt projection of the PSA polymer improves the alignment variation in the polar angle and the azimuth angle to the level equivalent to the state where the PSA polymer is pretilted over the entire surface. As a result, the alignment is stabilized.

The present application claims priority under the Paris Convention and the domestic law in the country to be entered into national phase on Patent Application No. 2006-218916 filed in Japan on Aug. 10, 2006, the entire contents of which are hereby incorporated by reference.

In the present description, the terms "or more" and "or less" mean that the value described (boundary value) is included.

BRIEF DESCRIPTION OF DRAWINGS

FIG. 1(a) shows a state under no voltage application. FIG. 1(b) shows a state under voltage application.

FIG. 2(a) shows a state where light is radiated to form the polymers. FIG. 2(b) shows a liquid crystal display panel in which the polymers have been formed by the photopolymerization.

FIG. 3(a) shows a sample which has been subjected to a PSA treatment, obtained from the liquid crystal display panel in Embodiment 1. FIG. 3(b) shows a sample which has not been subjected to a PSA treatment, obtained from the liquid crystal display panel in Comparative Embodiment 1.

FIG. 4-1 is a cross-sectional TEM photograph showing the alignment film surface. FIG. 4-1(a) shows a sample which has been subjected to a PSA treatment, obtained from the liquid crystal display panel in Embodiment 1. FIG. 4-1(b) shows a sample which has not been subjected to a PSA treatment, obtained from the liquid crystal display panel in Comparative Embodiment 1.

FIG. 4-2 shows a planar view showing a part cut from the cross section shown in FIG. 4-1. FIG. 4-1(a) shows Embodiment 1. FIG. 4-1(b) shows Comparative Embodiment 1.

FIG. 5(a) is a perspective view. FIG. 5(b) is a planar view. FIGS. 5(c) and 5(d) are views showing cross sections taken along lines A-B and C-D shown in FIGS. 5(a) and 5(b), respectively.

FIG. 7(a) is a perspective view. FIG. 7(b) is a planar view. FIG. 7(c) is a planar view showing arrangement of an electrode in the region shown in FIG. 7(b). FIGS. 7(d) and 7(e) are views showing cross sections taken along lines E-F and G-H shown in FIGS. 7(a) and 7(b), respectively.

FIG. 8(a) is a planar view of a pixel region to be subjected to the surface analysis. FIG. 8(b) is a perspective view showing the analysis results. FIG. 8(c) is a planar view showing the analysis results. FIG. 8(d) is a planar view schematically showing an alignment azimuth of a liquid crystal in the region shown in FIG. 8(c). FIGS. 8(e) and 8(f) are views showing cross sections taken along lines I-J and K-L shown in FIGS. 8(b) and 8(c), respectively.

FIG. 9(a) is a planar view. FIG. 9(b) is a cross-sectional view.

FIG. 10-1 is a planar view showing a liquid crystal display panel which is subjected to the liquid crystal responsivity analysis under the condition (p).

FIG. 10-2 is a cross-sectional view showing the liquid crystal display panel which is subjected to the liquid crystal responsivity analysis under the condition (p).

FIG. 10-3 is a planar view showing a liquid crystal display panel which is subjected to the liquid crystal responsivity analysis under the condition (q).

FIG. 10-4 is a cross-sectional view showing the liquid crystal display panel which is subjected to the liquid crystal responsivity analysis under the condition (q).

FIG. 10-5 is an enlarged planar view for explaining a planar shape of the tilt projection formed by the PSA polymer in FIG. 10-3.

FIG. 10-6 is a planar view showing a liquid crystal display panel which is subjected to the liquid crystal responsivity analysis under the condition (r).

FIG. 10-7 is a cross-sectional view showing the liquid crystal display panel which is subjected to the liquid crystal responsivity analysis under the condition (r).

FIG. 10-8 is a planar view showing a liquid crystal display panel which is subjected to the liquid crystal responsivity analysis under the condition (s).

FIG. 10-9 is a cross-sectional view showing the liquid crystal display panel which is subjected to the liquid crystal responsivity analysis under the condition (s).

FIG. 10-10 is an enlarged planar view for explaining the planar shape of the tilt projection formed by the PSA polymer in FIG. 10-8.

FIG. 11(a) shows the liquid crystal 5 msec later after the voltage application; FIG. 11(b) shows the liquid crystal 10 msec later after the voltage application; and FIG. 11(c) shows the liquid crystal 20 msec later after the voltage application under the condition (p). FIG. 11(d) shows the liquid crystal 5 msec later after the voltage application; FIG. 11(e) shows the liquid crystal 10 msec later after the voltage application; and FIG. 11(f) shows the liquid crystal 20 msec later after the voltage application, under the condition (q).

FIG. 13(a) shows the liquid crystal 5 msec later after the voltage application; FIG. 13(b) shows the liquid crystal 10 msec later after the voltage application; and FIG. 13(c) shows the liquid crystal 20 msec later after the voltage application under the condition (r). FIG. 13(d) shows the liquid crystal 5 msec later after the voltage application; FIG. 13(e) shows the liquid crystal 10 msec later after the voltage application; and FIG. 13(f) shows the liquid crystal 20 msec later after the voltage application, under the condition (s).

FIG. 16(a) shows a variation with time of the polar angle. FIG. 16(b) shows a variation with time of the azimuth angle.

FIG. 17(a) shows a variation with time of the polar angle. FIG. 17(b) shows a variation with time of the azimuth angle.

FIG. 18(a) shows a variation with time of the polar angle. FIG. 18(b) shows a variation with time of the azimuth angle.

FIG. 19(a) shows a variation with time of the polar angle. FIG. 19(b) shows a variation with time of the azimuth angle.

Figure 1:
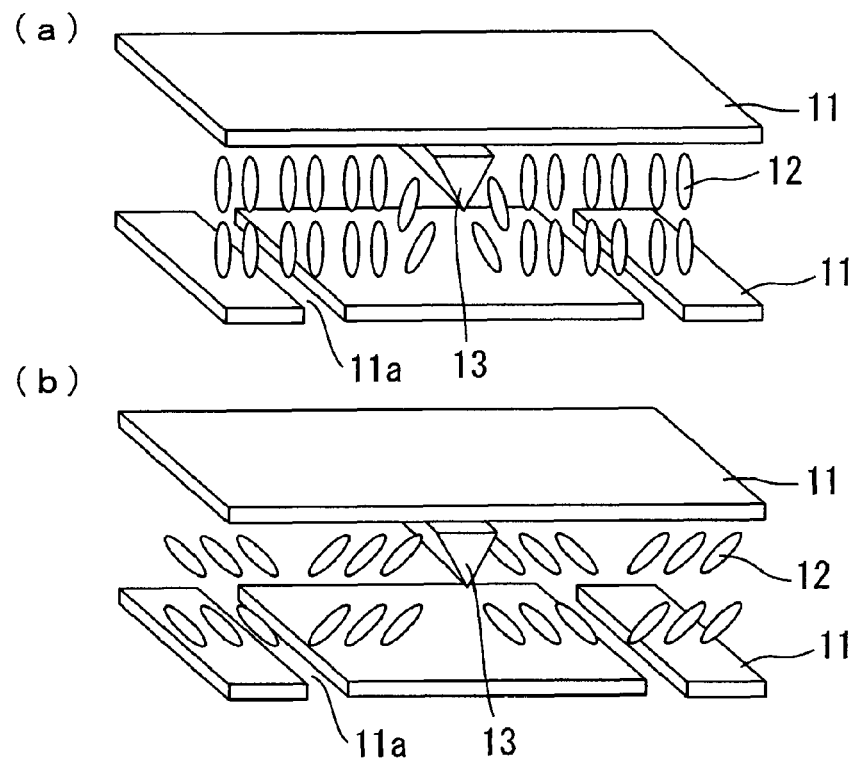
FIG. 1 is a view showing a configuration of a liquid crystal display device in MVA mode.
Figure 2:
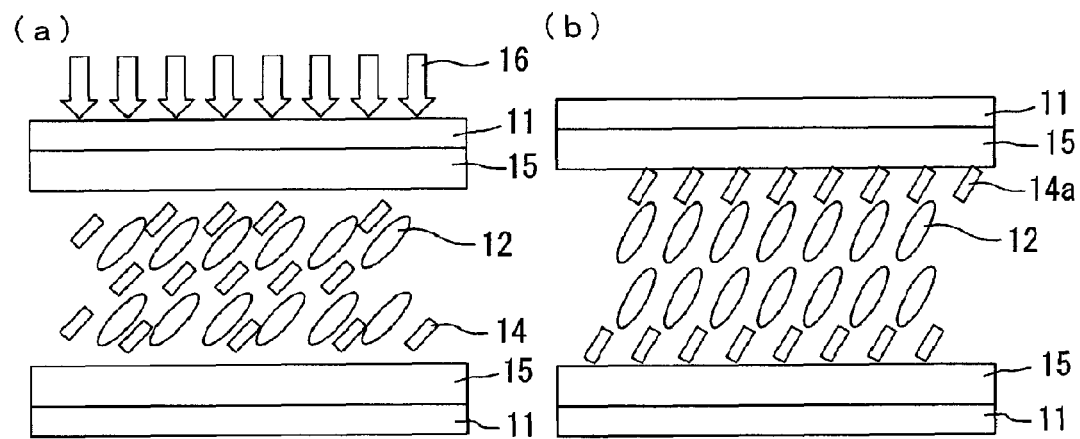
FIG. 2 is a view schematically showing a PSA technology.
Figure 3:
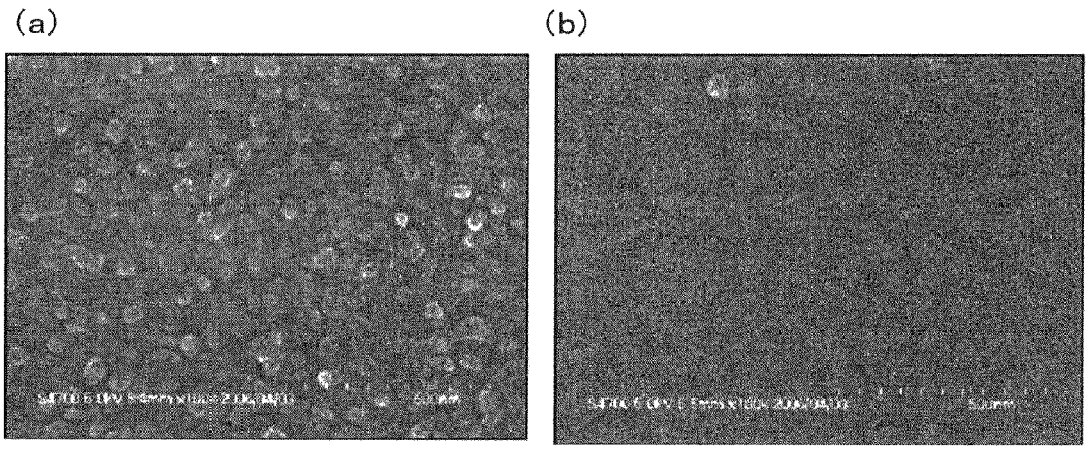
FIG. 3 is a plane SEM photograph of an alignment film surface.
Figures 1, 4:
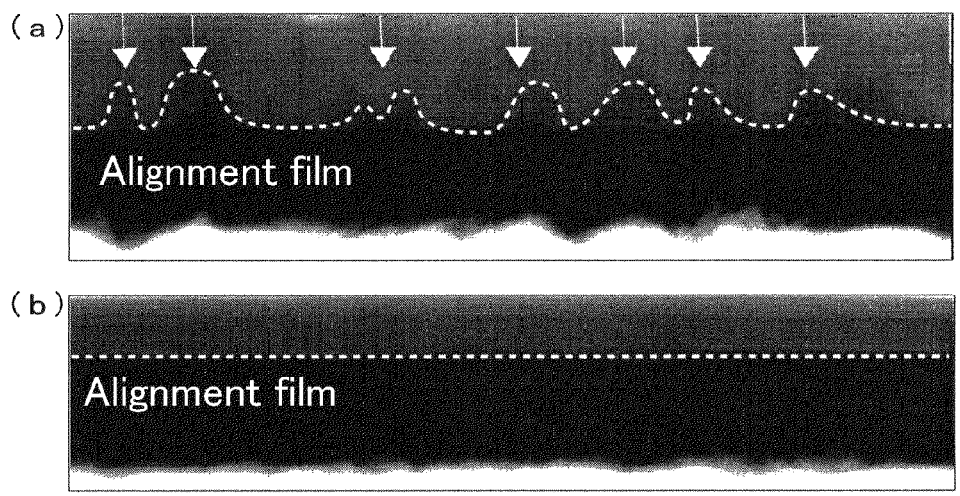
Figures 2, 4:
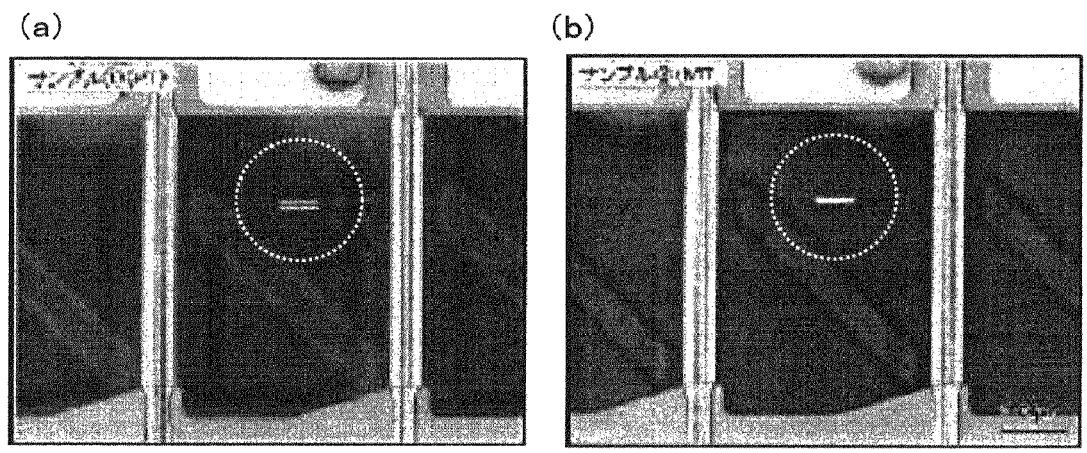
Figure 5:
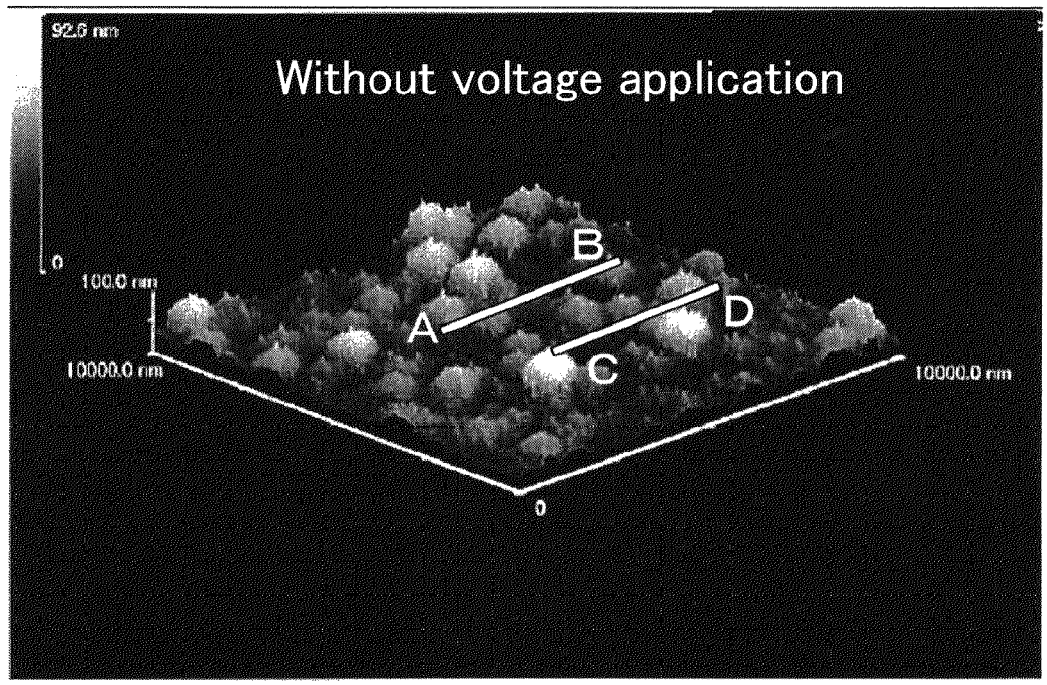
FIG. 5 show results of AFM surface analysis of a sample prepared from the liquid crystal display panel in Comparative Embodiment 2.
Figure 5:
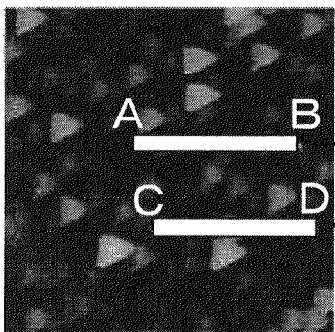
Figure 5:
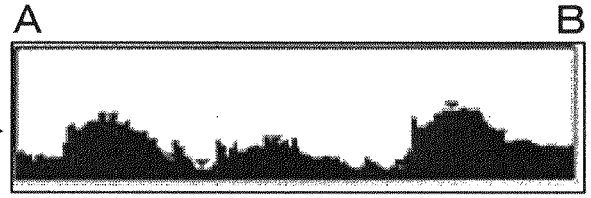
Figure 5:
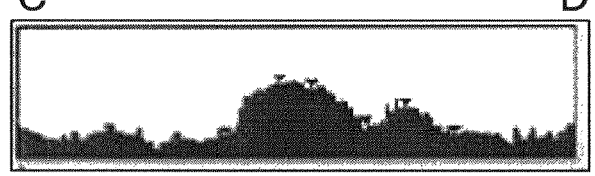
Figure 6:
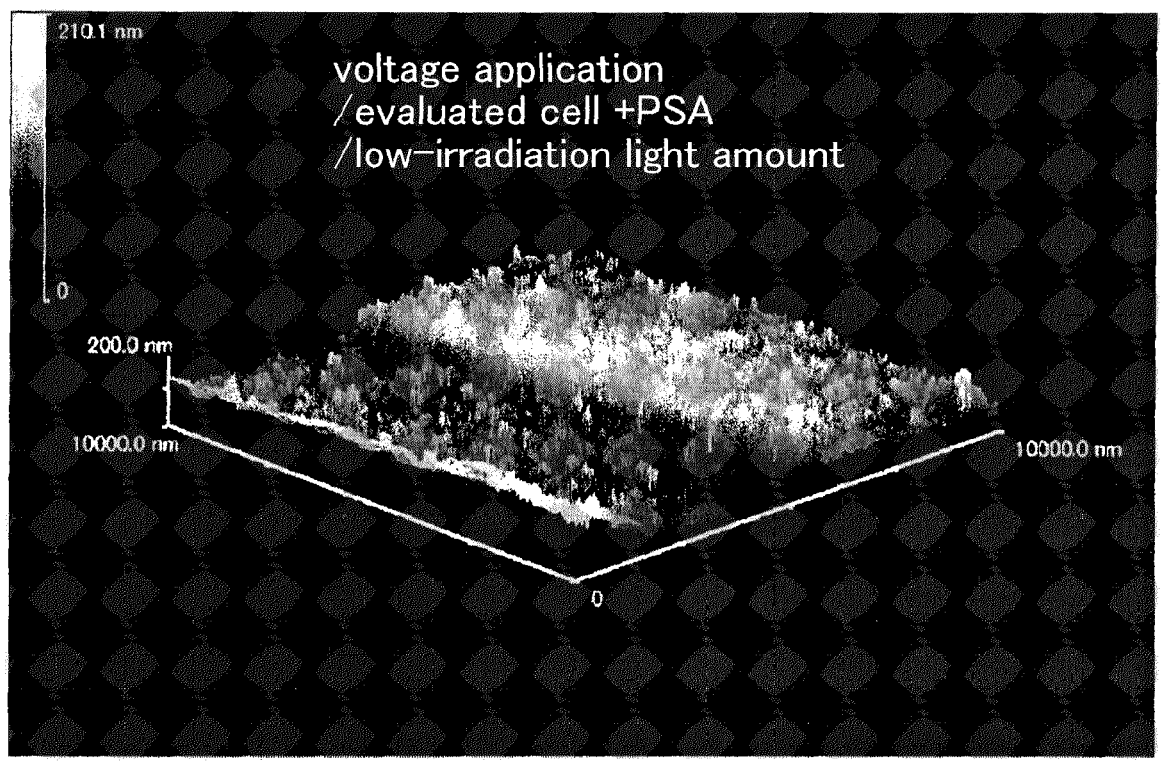
FIG. 6 is a perspective view showing results of AFM surface analysis of a sample obtained from the liquid crystal display panel in Comparative Embodiment 3.
Figure 7:
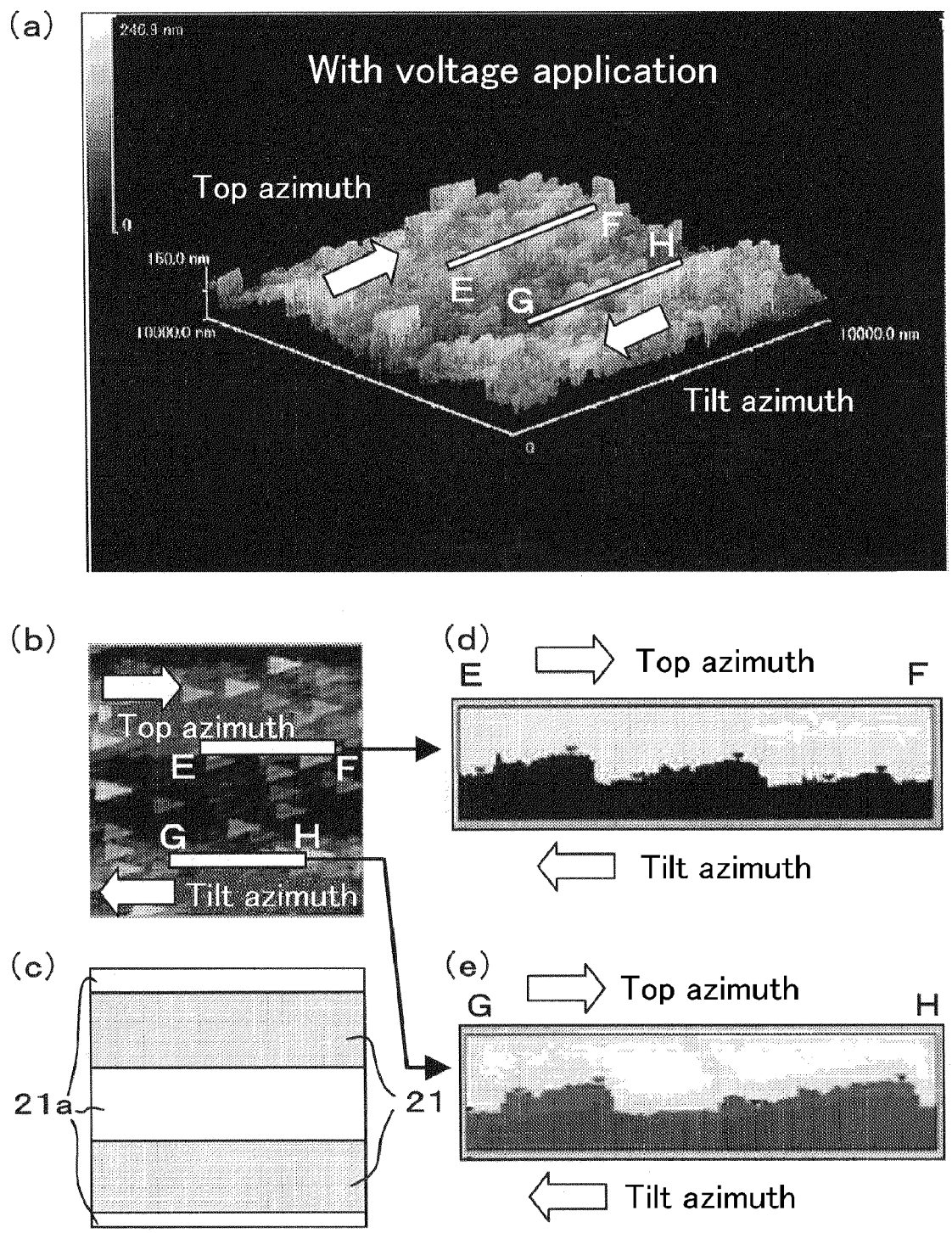
FIG. 7 shows results of AFM surface analysis of a sample prepared from the liquid crystal display panel in Embodiment 2.
Figure 8:
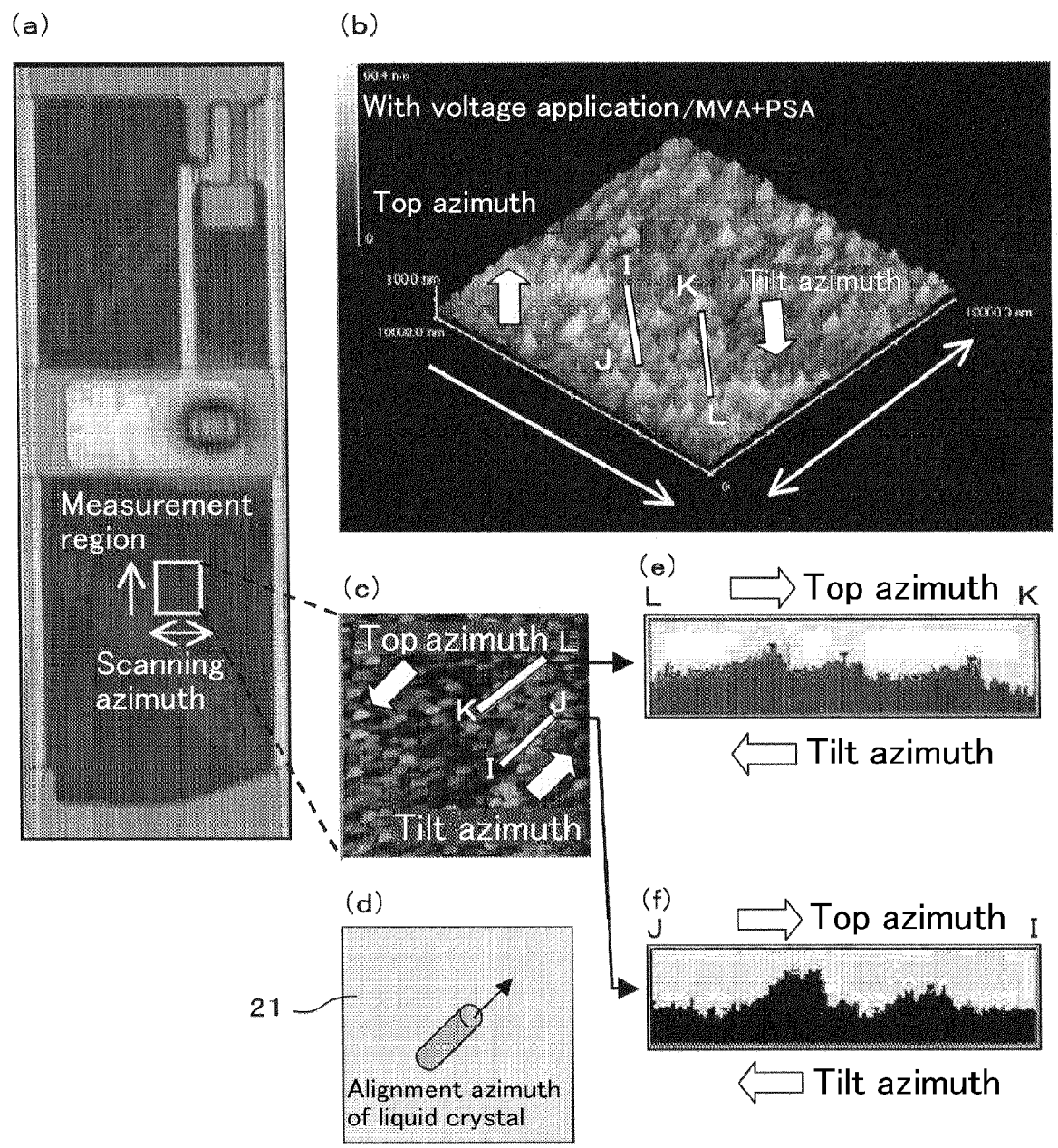
FIG. 8 shows results of AFM surface analysis of a sample prepared from the liquid crystal display panel in Embodiment 1.
Figure 9:
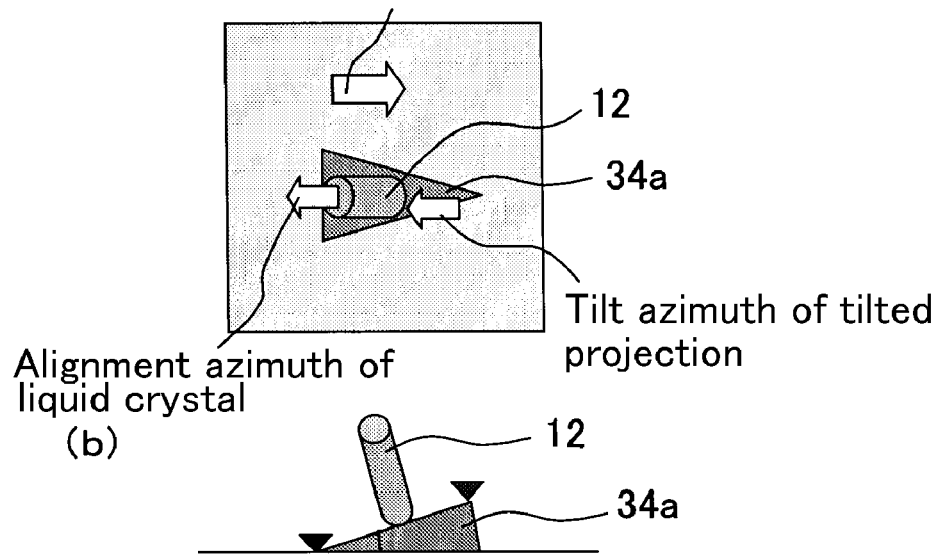
FIG. 9 is a view showing a relationship between a top azimuth of the tilt projection formed by the PSA polymer and an alignment azimuth of the liquid crystal molecule.
Figures 1, 10:
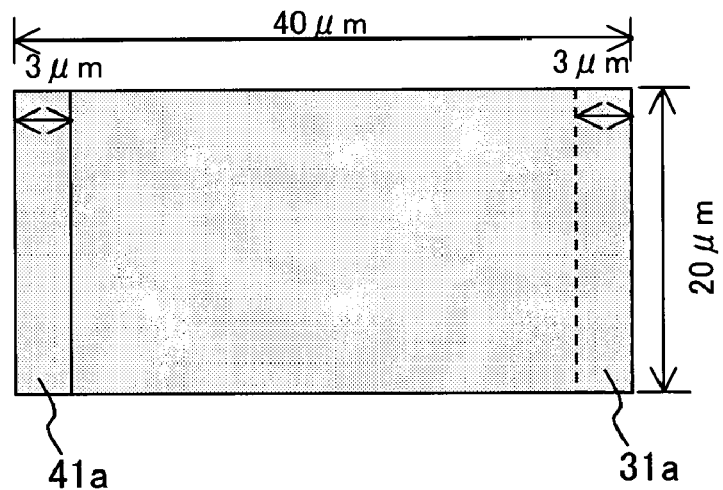
Figures 2, 10:
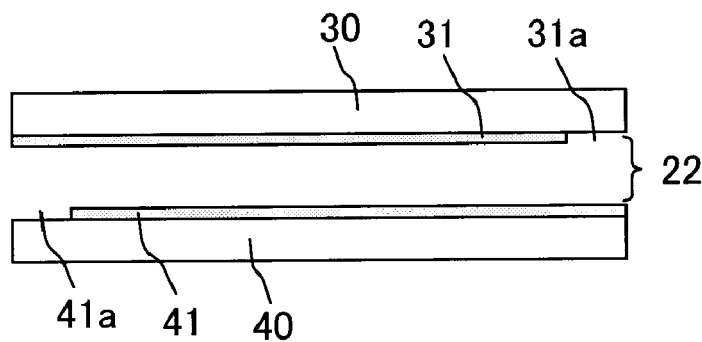
Figures 3, 10:
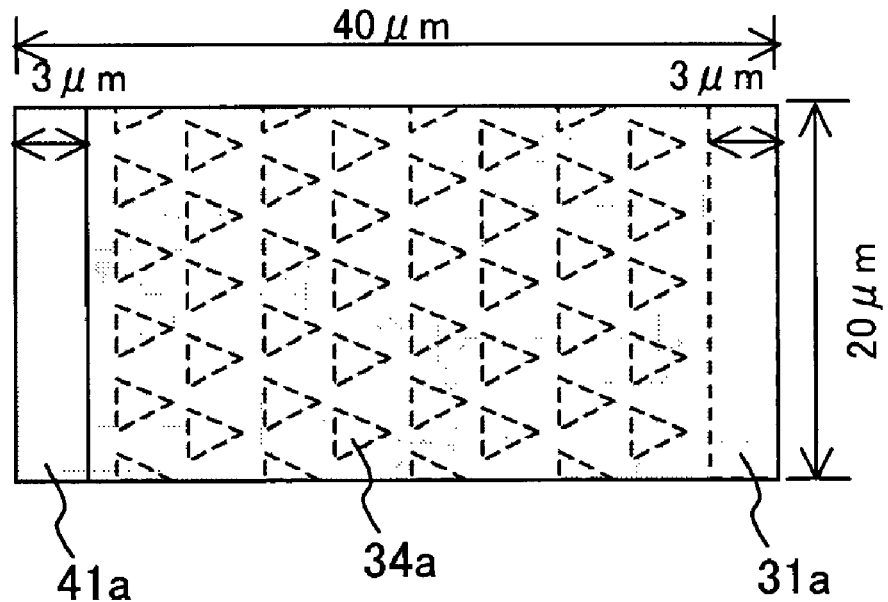
Figures 4, 10:
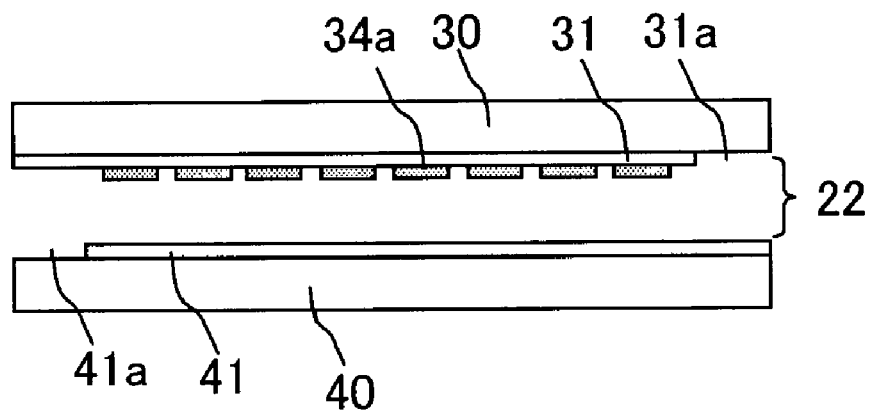
Figures 5, 10:
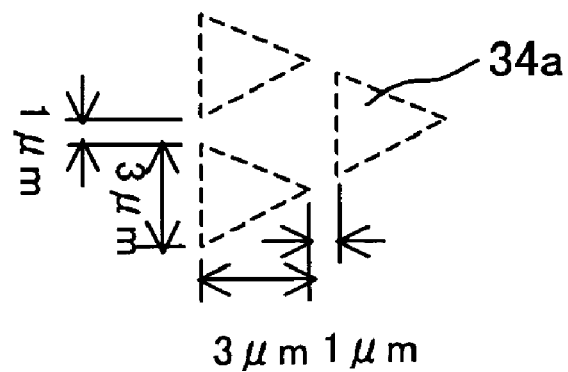
Figures 6, 10:
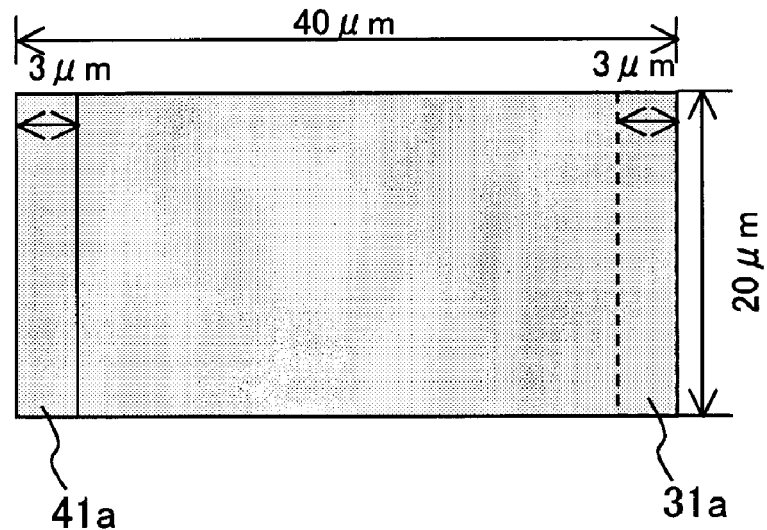
Figures 7, 10:
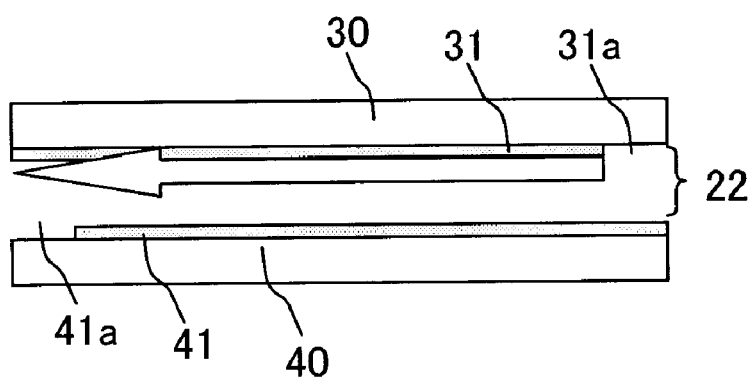
Figures 8, 10:
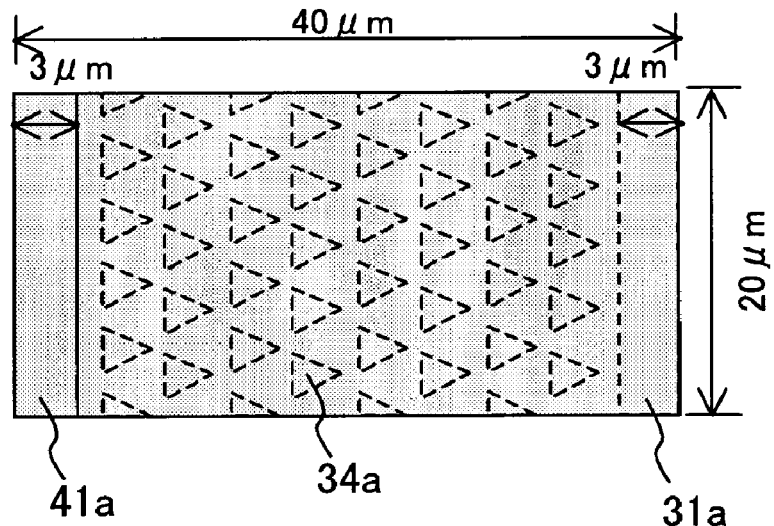
Figures 9, 10:
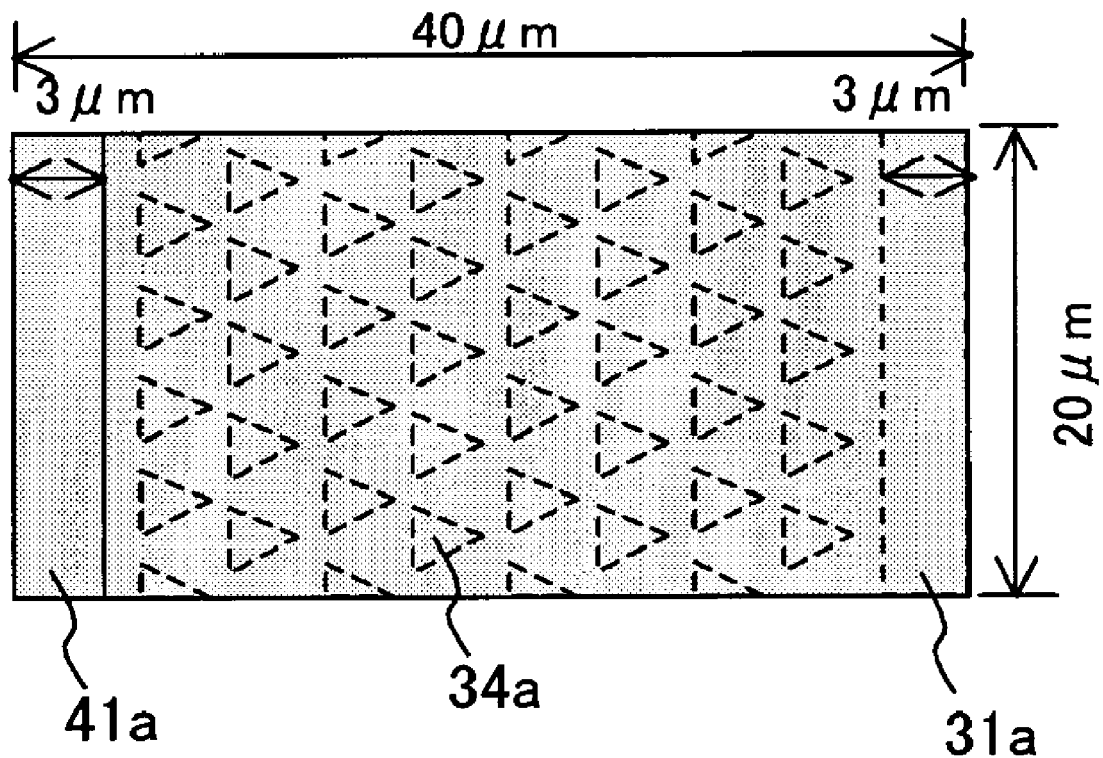
Figure 10:
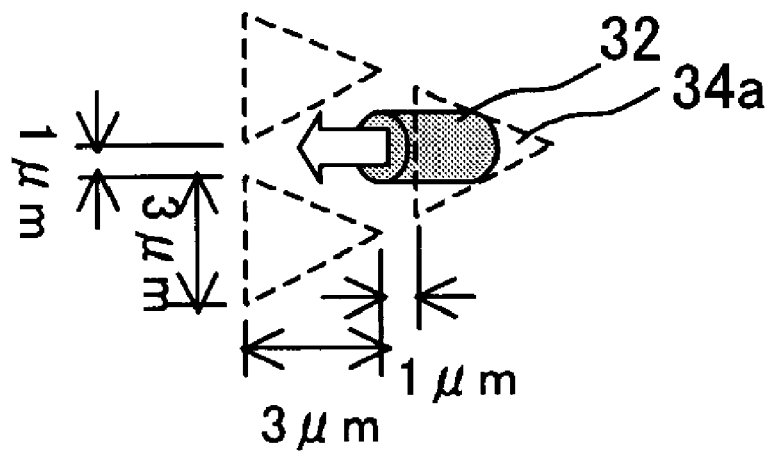
Figure 11:
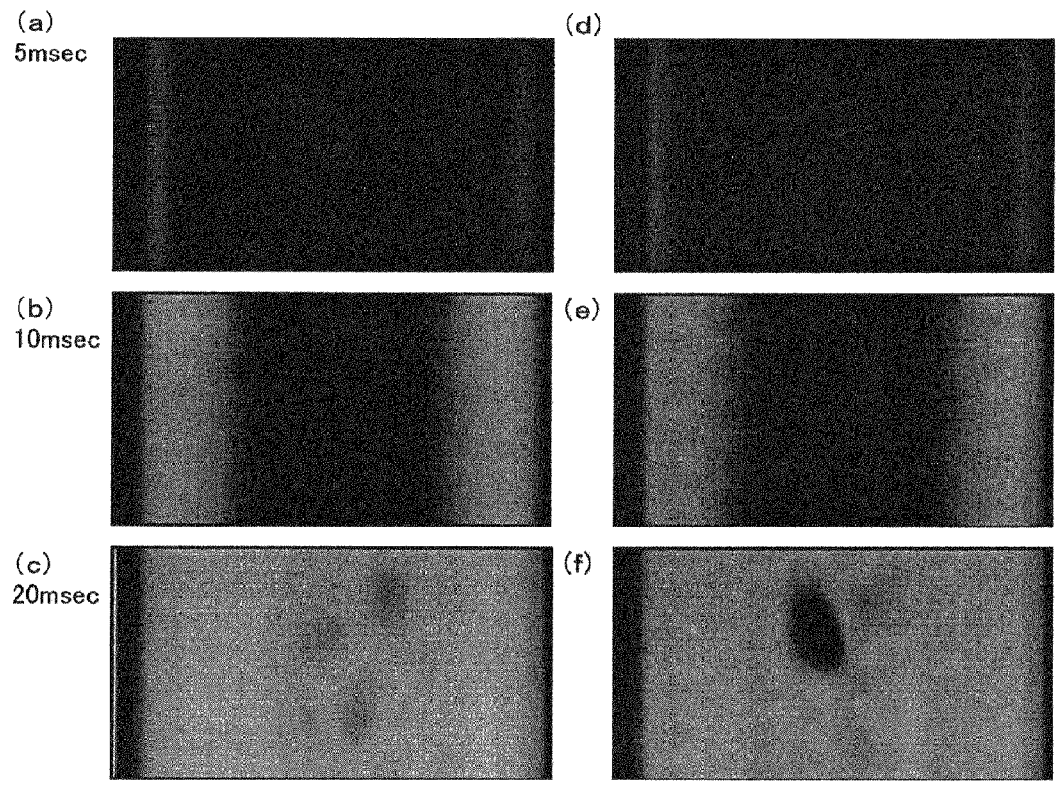
FIG. 11 is a view showing the state where the alignment of the liquid crystal varies as time has passed since the voltage application.
Figure 12:
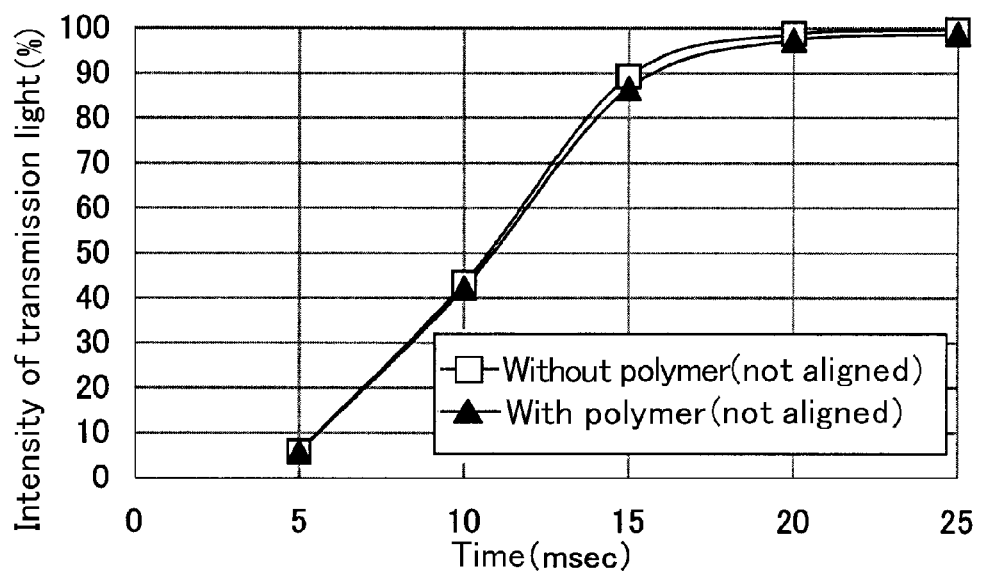
FIG. 12 is a graph for comparison, showing the variation of the transmissive light intensity as time has passes since the voltage application under the conditions (p) and (q).
Figure 13:
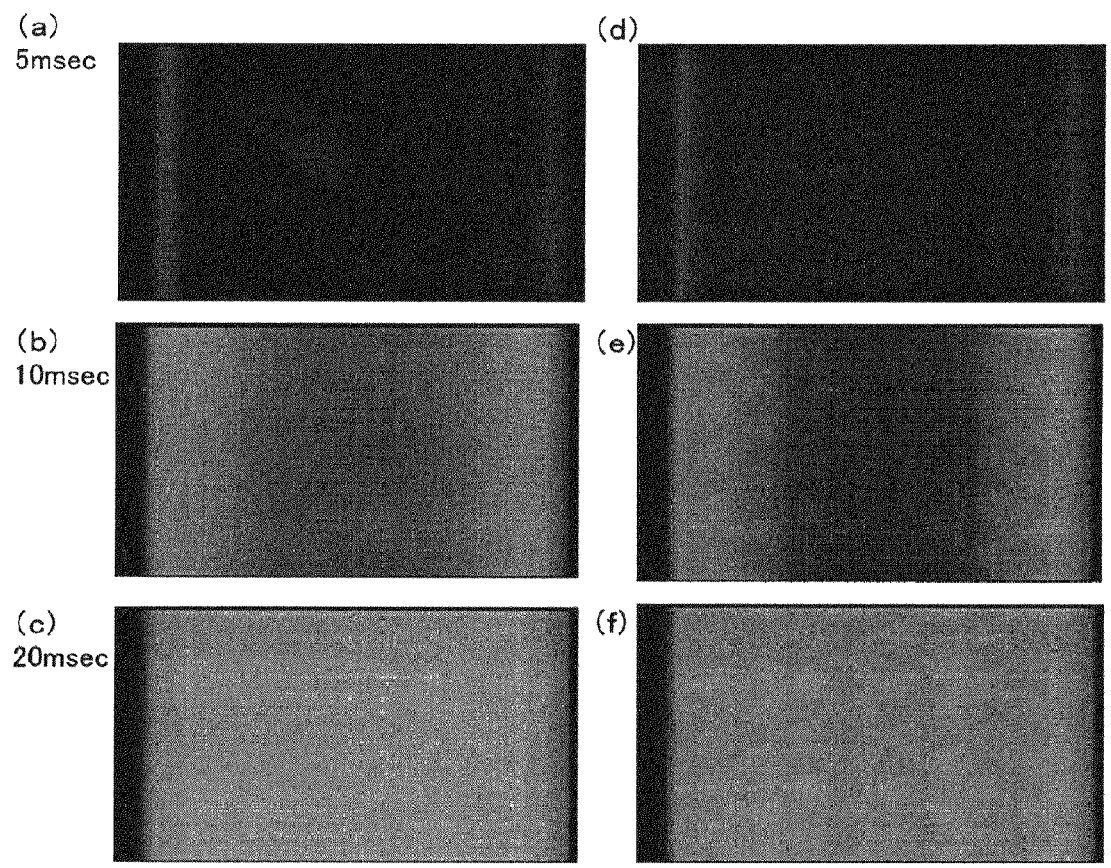
FIG. 13 is a view showing the state where the alignment of the liquid crystal varies as time has passed since the voltage application.
Figure 14:
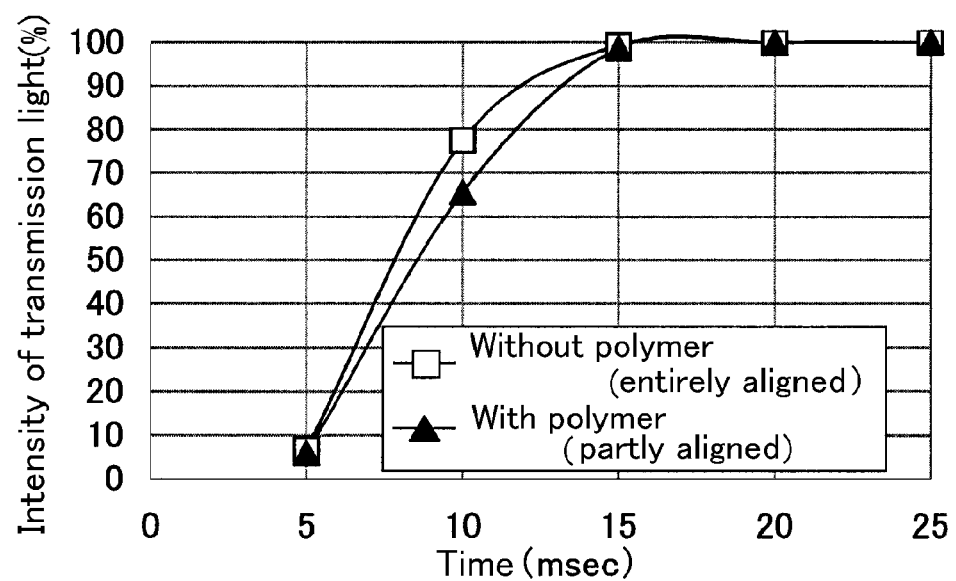
FIG. 14 is a graph for comparison, showing the variation of the transmissive light intensity as time has passed since the voltage application under the conditions (r) and (s).
Figure 15:
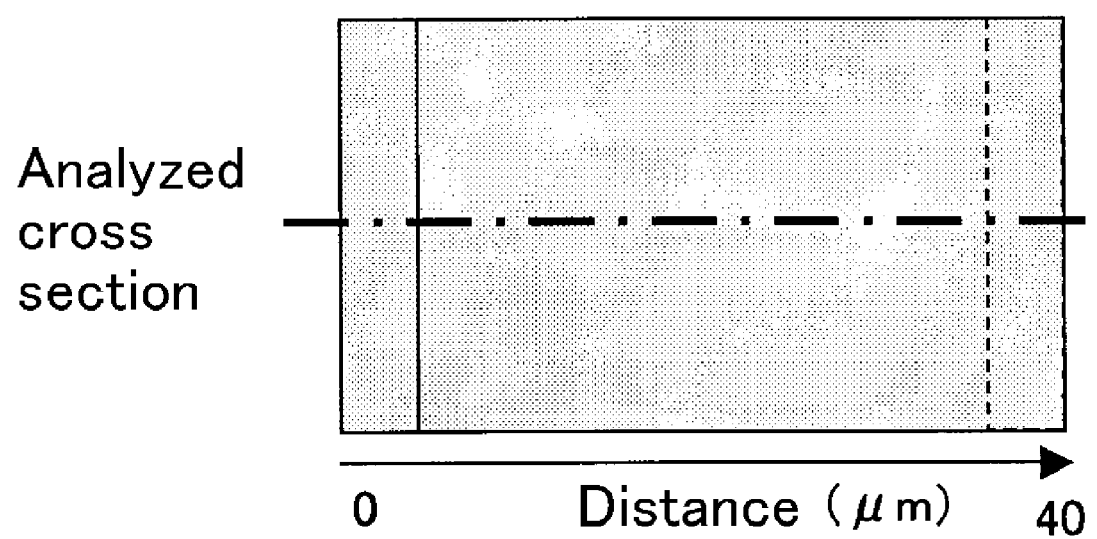
FIG. 15 is a planar view showing a liquid crystal display panel and shows calculation conditions used for the liquid crystal alignment analysis.
Figure 16:
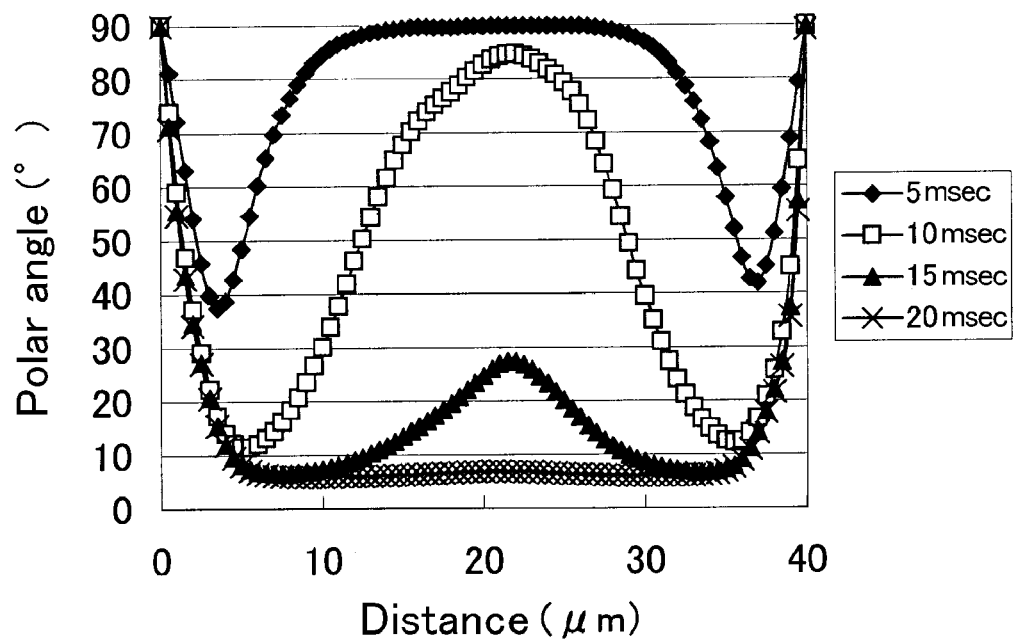
FIG. 16 is a graph showing results of the alignment analysis under the condition (p).
Figure 16:
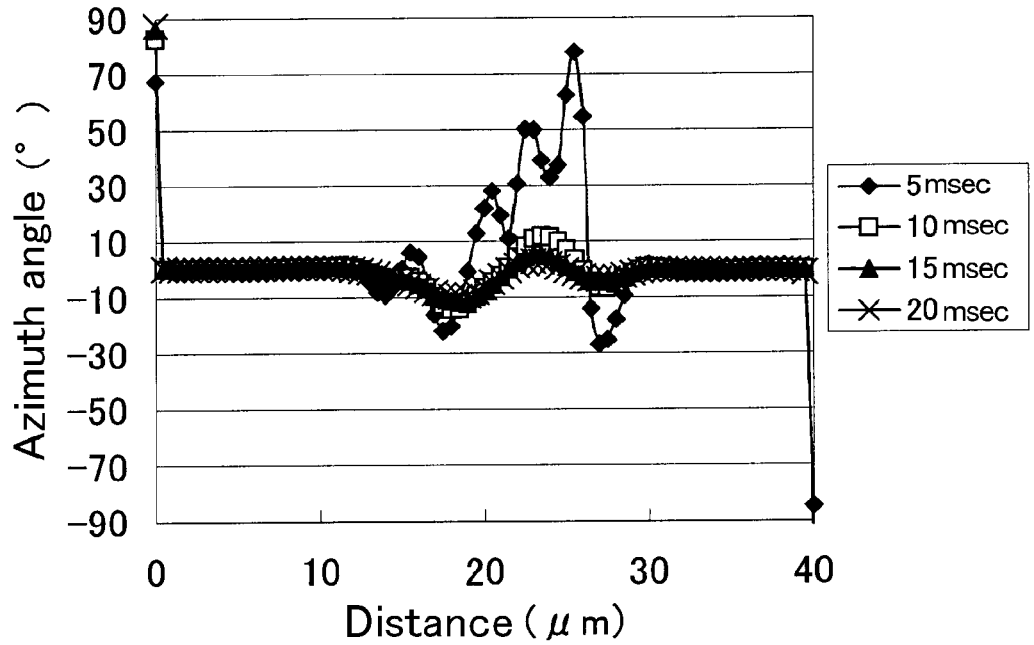
Figure 17:
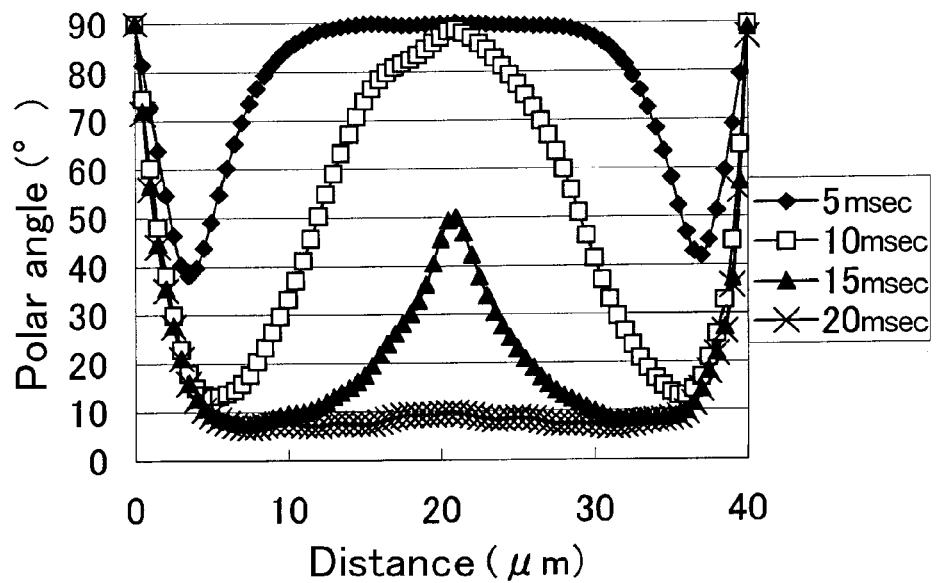
FIG. 17 is a graph showing results of the alignment analysis under the condition (q).
Figure 17:
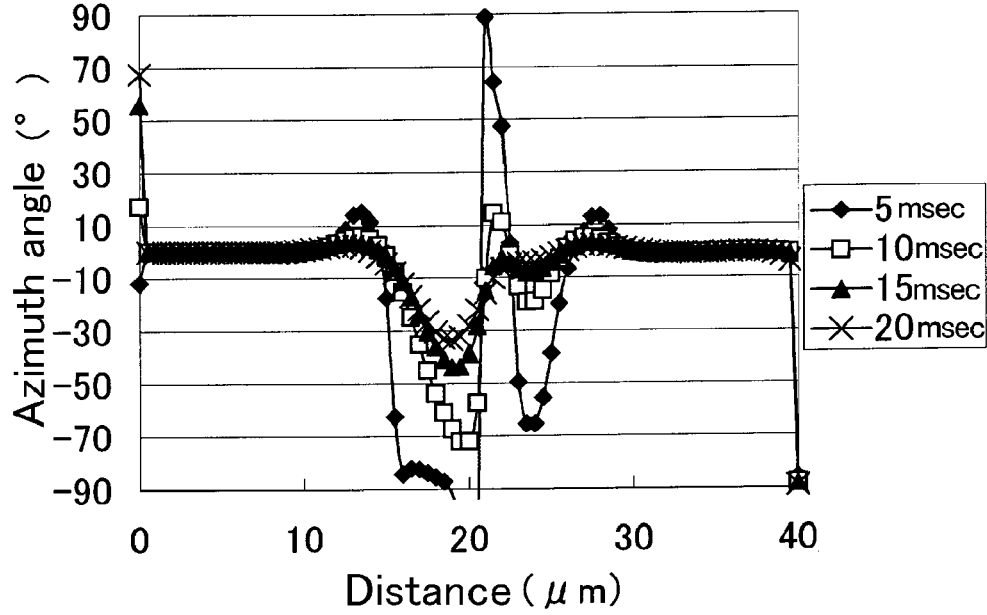
Figure 18:
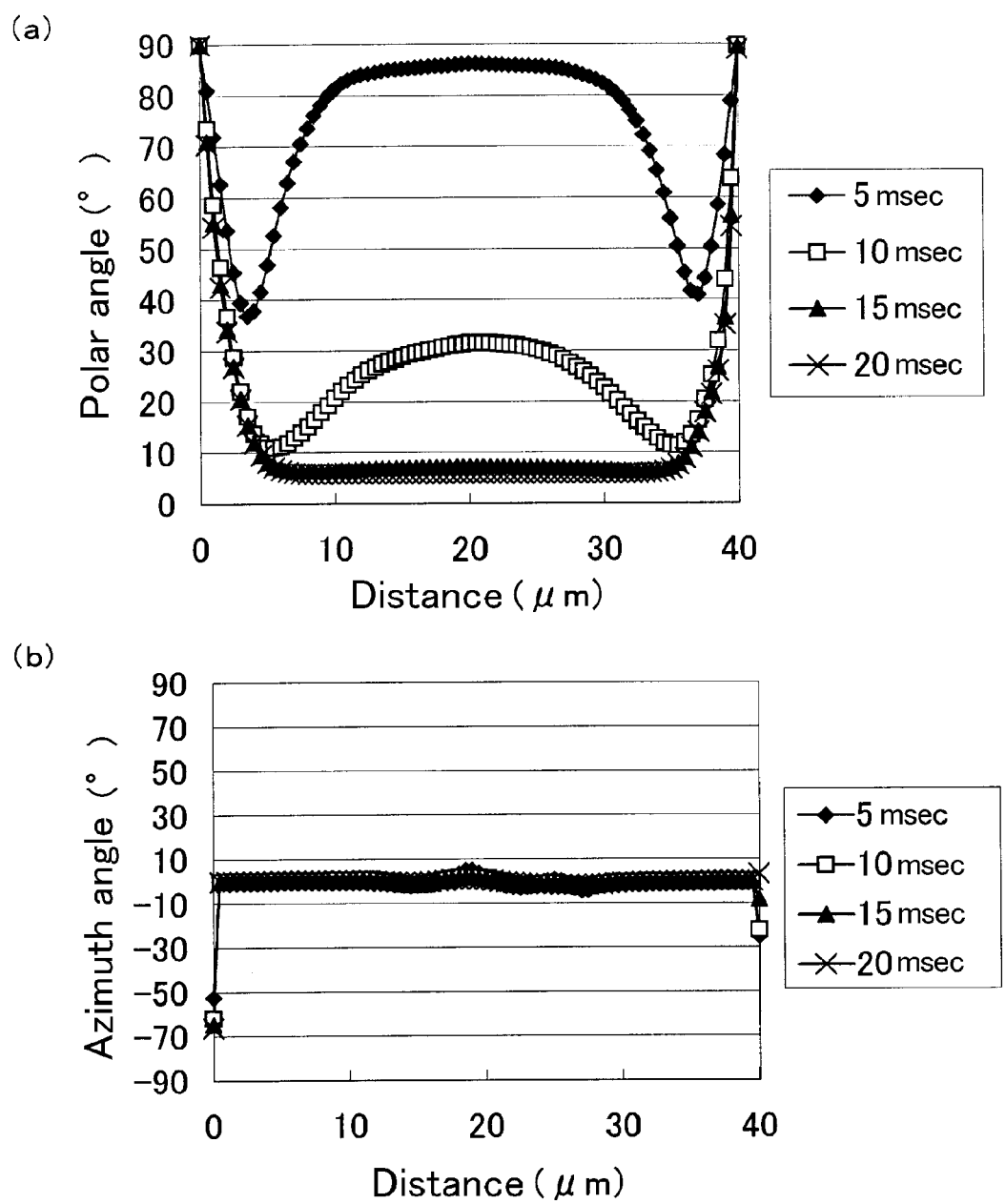
FIG. 18 is a graph showing results of the alignment analysis under the condition (r).
Figure 19:
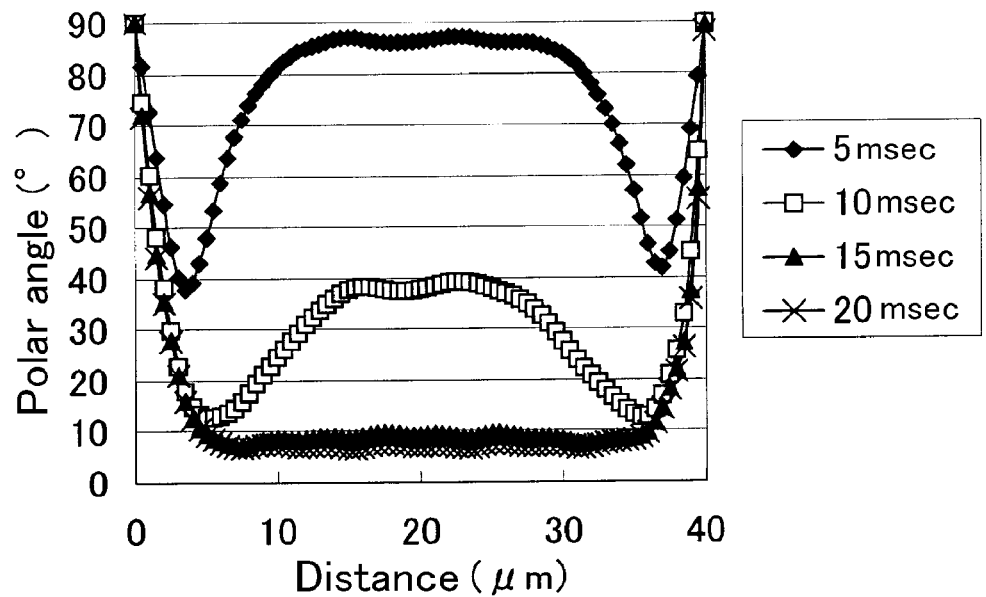
FIG. 19 is a graph showing results of the alignment analysis under the condition (s).
Figure 19:
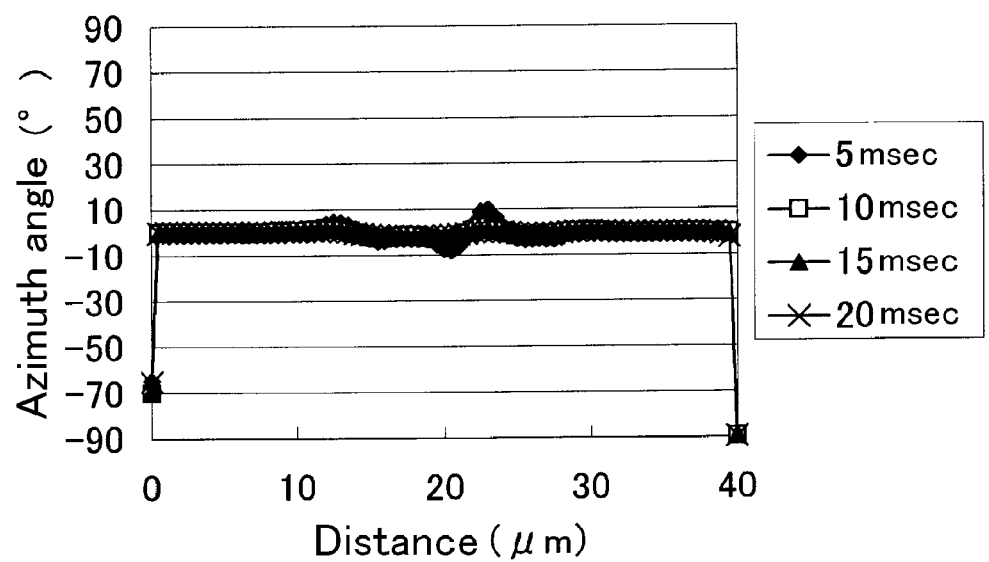

EXPLANATION OF NUMERALS AND SYMBOLS 11, 21: Electrode
11a, 21a, 31a, 41a: Slit
12, 32: Liquid crystal
13: Projective structure
14: Monomer
14a: Polymer
15: Alignment film 16: Light
22: Liquid crystal layer
30, 40: Array and counter substrates
31: Array-side electrode
34a: PSA polymer
41: Counter-side electrode

The invention claimed is:

1. A liquid crystal display device comprising:
a pair of substrates and a liquid crystal layer interposed between the pair of substrates,
wherein at least one of the pair of substrates includes a polymer on a surface in contact with the liquid crystal layer,
wherein the polymer is formed by polymerizing a monomer dispersed in the liquid crystal layer,
the polymer has a substantially saw-shaped surface as viewed from a cross-sectional direction of the pair of substrates, the substantially saw-shaped surface including a main tilt surface having a tilt angle smaller than other tilt surfaces, and
a direction of a tilt azimuth pointing from a high position to a low position in the main tilt surface of the polymer is substantially the same as an alignment direction of a liquid crystal at the time of voltage application.

2. The liquid crystal display device according to claim 1, wherein the polymer has a substantially wedge-shaped surface as viewed from a vertical direction of the pair of substrates, and a direction of a top azimuth of the substantially wedge-shaped surface is substantially opposite to an alignment direction of a liquid crystal at the time of voltage application.

3. The liquid crystal display device according to claim 1, wherein at least one of the pair of substrates includes an alignment film, and the polymer is partly formed on a surface of the alignment film.

4. The liquid crystal display device according to claim 1, wherein at least one of the pair of substrates includes a vertical alignment film, and the polymer is formed on a surface of the vertical alignment film.

5. The liquid crystal display device according to claim 1, wherein at least one of the pair of substrates includes a vertical alignment film, and the polymer is partly formed on a surface of the vertical alignment film.

6. A liquid crystal display device comprising:
a pair of substrates and a liquid crystal layer interposed between the pair of substrates,
wherein at least one of the pair of substrates includes a polymer on a surface in contact with the liquid crystal layer, the polymer has a substantially saw-shaped surface as viewed from a cross-sectional direction of the pair of substrates,
a direction of a tilt azimuth of a tilt surface of the polymer is substantially the same as an alignment direction of a liquid crystal at the time of voltage application, and
wherein the polymer has a substantially wedge-shaped surface as viewed from a vertical direction of the pair of substrates, and a direction of a top azimuth of the substantially wedge-shaped surface is substantially opposite to an alignment direction of a liquid crystal at the time of voltage application.

7. The display device of claim 6, wherein the polymer is formed by polymerizing a monomer dispersed in the liquid crystal layer.

8. The display device of claim 6, wherein the substantially saw-shaped surface comprises a main tilt surface having a tilt angle smaller than other tilt surfaces.

* * * * *